US010872221B2

(12) United States Patent
Kumar et al.

(10) Patent No.: US 10,872,221 B2
(45) Date of Patent: Dec. 22, 2020

(54) NON-CONTACT BIOMETRIC IDENTIFICATION SYSTEM

(71) Applicant: AMAZON TECHNOLOGIES, INC, Seattle, WA (US)

(72) Inventors: Dilip Kumar, Seattle, WA (US); Manoj Aggarwal, Seattle, WA (US); George Leifman, Haifa (IL); Gerard Guy Medioni, Seattle, WA (US); Nikolai Orlov, Seattle, WA (US); Natan Peterfreund, Kiryat Tivon (IL); Korwin Jon Smith, Seattle, WA (US); Dmitri Veikherman, Nesher (IL); Sora Kim, Seattle, WA (US)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 57 days.

(21) Appl. No.: 16/014,843

(22) Filed: Jun. 21, 2018

(65) Prior Publication Data

US 2019/0392189 A1 Dec. 26, 2019

(51) Int. Cl.
*G06K 9/00* (2006.01)
*G06N 3/04* (2006.01)

(52) U.S. Cl.
CPC ....... *G06K 9/0004* (2013.01); *G06K 9/00067* (2013.01); *G06N 3/0454* (2013.01); *G06K 2009/0006* (2013.01); *G06T 2207/20084* (2013.01)

(58) Field of Classification Search
CPC .......... G06K 9/00033; G06K 9/00087; G06K 2009/00932; G06K 9/00013; G06K 9/00006
See application file for complete search history.

(56) References Cited

U.S. PATENT DOCUMENTS

| 2010/0045788 A1* | 2/2010 | Zhang | G06K 9/00087 348/77 |
| 2015/0356339 A1* | 12/2015 | Demos | G06K 9/00885 348/77 |

(Continued)

OTHER PUBLICATIONS

He, Kaiming, et al, "Deep Residual Learning for Image Recognition", Microsoft Research, arXiv:1512.03385v1 [cs.CV] Dec. 10, 2015, Retrieved from the Internet: << https://academic.microsoft.com/#/detail/2194775991 >>.

(Continued)

*Primary Examiner* — Menatoallah Youssef
(74) *Attorney, Agent, or Firm* — Lindauer Law, PLLC

(57) ABSTRACT

A non-contact biometric identification system includes a hand scanner that generates images of a user's palm. Images are acquired using light of a first polarization at a first time that show surface characteristics such as wrinkles in the palm while images acquired using light of a second polarization at a second time show deeper characteristics such as veins. Within the images, the palm is identified and subdivided into sub-images. The sub-images are subsequently processed to determine feature vectors present in each sub-image. A current signature is determined using the feature vectors. A user may be identified based on a comparison of the current signature with a previously stored reference signature that is associated with a user identifier.

20 Claims, 12 Drawing Sheets

(56) References Cited

U.S. PATENT DOCUMENTS

| | | | |
|---|---|---|---|
| 2015/0356362 A1* | 12/2015 | Demos | G06K 9/00013 382/115 |
| 2017/0091568 A1 | 3/2017 | Hama et al. | |

OTHER PUBLICATIONS

Bastle, Joel, "Notification of Transmittal of the International Search Report and Written Opinion dated May 27, 2020", Patent Cooperation Treaty Application No. PCT/US19/38225, Patent Cooperation Treaty, May 27, 2020.

* cited by examiner

NON-CONTACT BIOMETRIC IDENTIFICATION SYSTEM

BACKGROUND

Facilities such as stores, libraries, hospitals, offices, and so forth, may need the ability to identify users in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
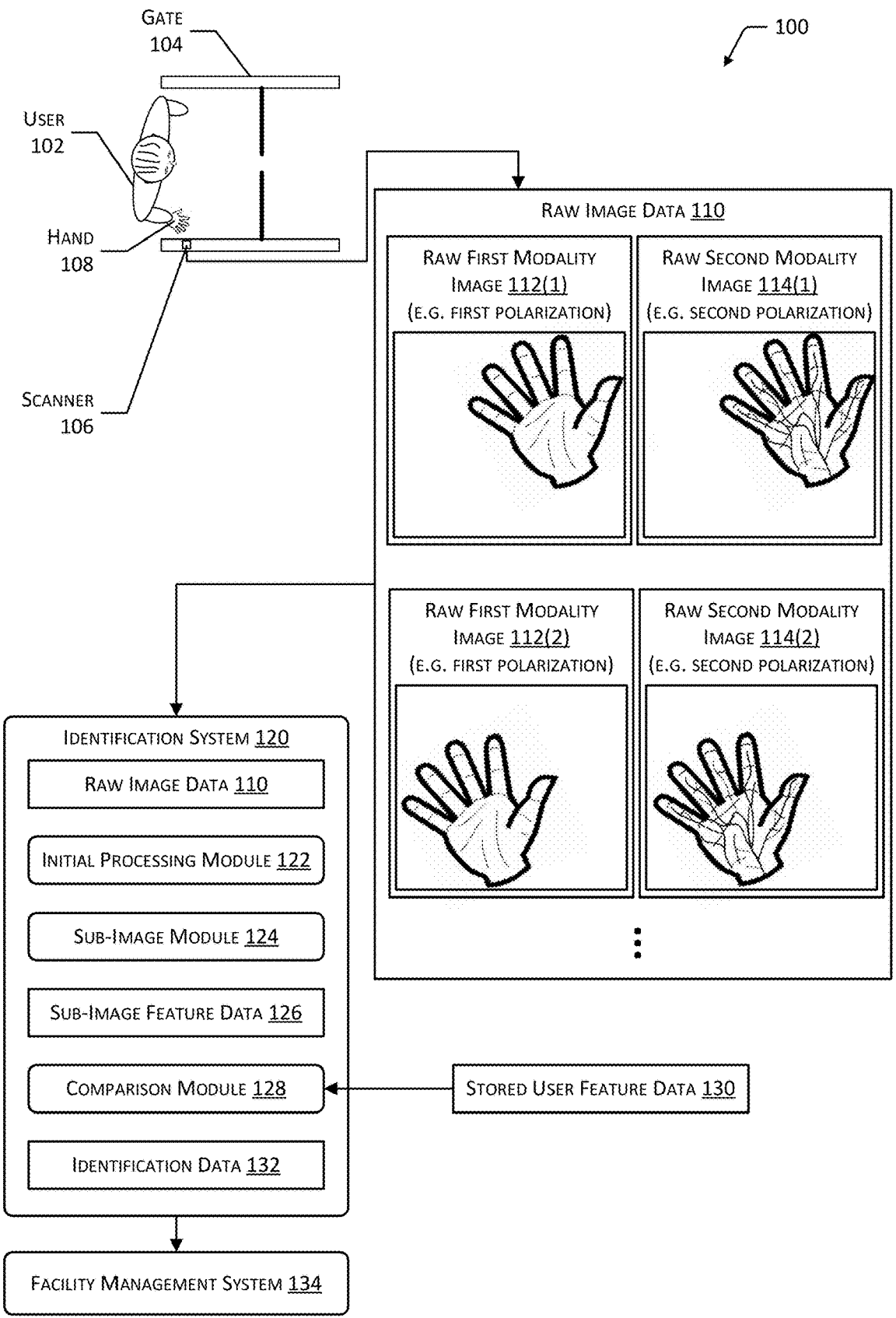
FIG. 1 illustrates a system to identify a user at a facility, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Accurate and fast identification of a user provides useful information that may be used in a variety of ways. For example, entry to a material handling facility (facility), office, transportation facility, or other location may be controlled based on user identity. In another example, information about the identity of the user may also be used to associate particular actions made by that particular user with an associated account.

The facility may include, or have access to, a facility management system. The facility management system may be configured to maintain information about items, users, condition of the facility, and so forth based at least in part on sensor data obtained by one or more sensors. The facility management system may use the sensor data to determine interaction data. The interaction data may include information about a type of item involved in an interaction, quantity involved in the interaction, whether the interaction was a pick or place, who performed the interaction, and so forth. Interactions may include the user picking an item from an inventory location, placing an item at the inventory location, touching an item at the inventory location, rummaging through items at the inventory location, and so forth. For example, the facility management system may generate interaction data that indicates what item the user picked from a particular lane on a shelf, and then use this interaction data to adjust the count of inventory stowed at that lane.

As the user enters the facility, they may be identified using the devices and techniques described herein. Once identified, they may be located while in the facility. Information obtained by other sensors, such as weight sensors, cameras, and so forth, in the facility may be used to determine the interaction data. This interaction data may then be associated with the particular user who has been previously identified, and subsequently used for billing or other purposes. For example, the interaction data and identification data may be used to bill an account associated with the identified user for the item that was picked.

Traditional systems for identifying users suffer from several significant drawbacks including susceptibility to fraud, speed, accuracy, and operational limitations. For example, a traditional system to identify a user by presenting a token, such as an identification card, may be used by someone other than an authorized user. As a result, systems that involve only the use of "something you have" are vulnerable to misuse. Biometric identification systems deal with this by using a characteristic of the particular individual that is difficult or impossible to copy or be transferred. However, operation of traditional biometric identification systems introduces operational problems and may also exhibit serious latencies in heavy-use environments. For example, traditional palm-based biometric identification systems require physical contact between the user's hand and a scanning device. This physical contact may be deemed unsanitary and may be difficult to accomplish for some users. Existing systems are also relatively slow to gather and process information. These and other factors result in existing systems being unsuitable for use in situations where rapid identification of users is called for without significantly impeding the flow of user traffic. For example, the delays introduced by existing systems would produce serious negative impacts such as delays at an entry to the facility which services tens of thousands of users in a given day.

Described in this disclosure is a system that provides for non-contact biometric identification of users. A scanner device is used to obtain raw images of a user's palm that is within a field of view of the scanner. The scanner obtains a first set of one or more raw images that use infrared light with a first polarization and a second set of one or more raw images that use infrared light with a second polarization. The first set of images depict external characteristics, such as lines and creases in the user's palm while the second set of images depict internal anatomical structures, such as veins, bones, soft tissue, or other structures beneath the epidermis of the skin.

The raw images undergo initial processing to provide a set of images obtained using the first and second polarizations that contain a hand, that the images are well illuminated, in focus, show the hand in a particular orientation, show the hand in a particular canonical pose, rectified, are indicative of which hand is presented (left or right), and so forth. Images in this set of images are then divided into sub-images or "patches". For example, an image that depicts external characteristics may be divided into a set of 15×15 sub-images. In some implementations each sub-image may overlap with an adjacent sub-image, while in other implementations the sub-images may exhibit no overlap. Continuing the example, an image that depicts second modality features may be divided into a set of 7×7 sub-images, with each sub-image overlapping an adjacent sub-image. In some implementations, additional image processing may be used. For example, an image transform may be applied to a sub-image that depicts a curved surface to represent that curved surface as a flat surface. The sub-images are then processed to determine feature vectors that represent image features present in that sub-image.

A neural network may be used to determine the feature vectors. For example, a neural network may be trained to recognize features in sub-images. Once trained, the neural network may accept as input a sub-image and produce as output a feature vector that characterizes one or more features present in the sub-image. In some implementations, different neural networks may be used to produce the respective feature vectors for sub-images of second modality images and sub-images of first modality images. The resulting feature vectors representative of features in the sub-images from different modalities may then be used to generate a current signature that is indicative of the features of at least a portion of the hand that the user has presented. For example, the feature vectors obtained from different modalities may be concatenated to produce a linear vector that is used as the current signature, or another neural network may access the feature vectors as input and produce the current signature. In another implementation, the feature vectors from multiple images of the same modality may be averaged, and the resulting average feature vector may then be used to determine the signature. This averaging may reduce the effects of noise associated with values of the feature vectors.

In another implementation, a feature vector with a first dimensionality may be processed with a neural network to produce an output feature vector with a second dimensionality that is less than the first dimensionality. The output feature vector may then be used to generate the signature.

Identification of the user who presented the hand to the scanner may involve one or more comparisons to previously stored data, such as reference signatures produced from feature vectors of images obtained during an enrollment process. For example, the current signature may be compared to previously stored reference signatures. The reference signatures are associated with user identifiers. In one implementation the identity may be determined based on the reference signature that is the closest in vector space to the current signature. In another implementation, identity may be determined by processing raw image data over time. For example, the confidence values associated with several different user identifiers may be determined, and as successive raw image data is processed confidence values above a threshold value may be used to register a vote for a particular user identifier. When a particular user identifier reaches a threshold number of votes, the identity associated with that user identifier may be deemed to be the identity of the user.

The enrollment process may include acquiring and processing raw images of the user and determining the signature as described above. The signature may then be stored as a reference signature that is associated with a particular identity. For example, the raw images obtained during the enrollment process may be processed using one or more neural networks to determine feature vectors for the sub-images. These feature vectors may then be used to determine the reference signature representative of a palm. For example, a left hand reference signature and a right hand reference signature may be determined based on the feature vectors for each hand, and stored for each user. By utilizing the scanner described above, raw images of both first modality and second modality features may be quickly and easily acquired. These raw images are closely aligned with one another. For example, the scanner may utilize one or more cameras operating at 30 frames per second, with images alternating between a first modality image and a second modality image. These closely aligned images facilitate the processing of the images by reducing or eliminating the need for additional alignment processing. The acquisition of these first modality and second modality images provides a rich set of features that improve the accuracy of the identification.

By dividing the images into sub-images and determining the respective feature vectors for each, the system is able to more quickly process the image data and tolerate variations. For example, the use of sub-images allows for more compact neural networks to be used that are computationally simpler and faster to execute to generate the feature vectors. The sub-images may also be processed in parallel, further increasing the speed of the system.

By using confidence values associated with matches between the feature vectors of respective sub-images and previously stored data, the system is more tolerant to local variations in the features. For example, if the user has a new callous or fresh bruise on their palm, a confidence value for the sub-image that includes that feature may be reduced. However, the confidence values in the other sub-images may be sufficient to assert identity.

Conventional systems are relatively intolerant of changes in pose, position, and distance, of the user's hand. As a result, these systems typically require the use of a guide or surface upon which the user would need to place their hand. The scanner design described herein and the use of sub-images removes the need for the user's hand to come into contact with a sensor platform or guide. For example, the rapid acquisition of the raw image data with the second modality and first modality features in combination with the use of the sub-images allows for more raw image data to be acquired. Continuing the example, many images may be acquired, increasing the chance of obtaining second modality and first modality images that include the hand at or close to a desired orientation and pose.

The use of the sub-images allows for more localized, targeted, and computationally simpler transforms to be applied to facilitate generation of feature vectors. This improves the ability to extract meaningful features from various orientations and poses of the user's hand. For example, if the pose of the hand is such that a portion of the palm is flexed or otherwise articulated, specific transforms may be applied to the sub-image of that particular portion to remap and "flatten" the sub-image that depicts the portion. This "flattened" sub-image may then be used as input to the neural network, and subsequent feature vectors generated for the sub-image. As a result, the feature vectors for that sub-image may be used to contribute to the identification of the user, improving overall accuracy of the system.

Scanners may be placed at one or more of entrances to the facility, exits from the facility, or designated areas within the facility. By using the identification data produced by the identification system, the facility management system is able to determine the presence of a particular user at the particular scanner at a particular time. Such information may be used to associate subsequent interactions by the identified user with an account of that user. For example, if the user picks an item from an inventory location and leaves the facility, their account may be billed for that item.

Overall operation of the facility management system is improved by using the techniques described herein. For example, the identification system described herein allows for identification of a user to be performed more accurately, with reduced latency, and with less computational resources than other systems.

Illustrative System

FIG. 1 illustrates a system 100 to identify a user 102 at a facility, according to some implementations.

The facility may include a gate 104. In some implementations, the gate 104 may include a movable barrier to control movement of the user 102. For example, the gate 104 may include computer-controlled panels that may be closed to impede passage of the user 102 or opened to permit passage of the user 102. The gate 104 may include one or more scanners 106. The user 102 may approach the gate 104 and place their hand 108 over the scanner 106.

The scanner 106 may generate raw image data 110. The scanner 106 is configured to acquire images of the hand 108 that are illuminated using infrared light that has two or more particular polarizations, with different illumination patterns, and so forth. The scanner 106 is described in more detail below with regard to FIG. 2. The scanner 106 may produce a raw image data 110. For example, during operation the user 102 may present their hand 108 with the palm or volar region of the hand facing the scanner 106. As a result, the raw image data 110 is of the anterior portion of the hand 108. In other implementations, the raw image data 110 may include the back of the hand 108.

Depending upon the polarization used, the images produced by the scanner 106 may be of first modality features or second modality features. The first modality may utilize images in which the hand 108 is illuminated with light having a first polarization and obtained by a camera with a polarizer passing light to the camera that also has the first polarization. First modality features may comprise features that are close to, or on, a surface of the hand 108 of the user 102. For example, the first modality features may include creases, wrinkles, scars, dermal papillae ridges, and so forth in at least the epidermis of the hand 108.

Second modality features comprise those features that are below the epidermis. The second modality may utilize images in which the hand 108 is illuminated with light having a second polarization and obtained by the camera with the polarizer passing light to the camera with the first polarization. For example, the second modality features may include anatomical structures such as veins, bones, soft tissue, and so forth. Some features may be visible in both first modality and second modality images. For example, a crease in the palm may include first modality features on the surface as well as deeper second modality features within the palm.

The raw image data 110 may comprise one or more of the following types of images. A raw first modality image 112(1) is obtained by a camera with a polarizer that passes a first polarization of infrared light while the hand 108 is illuminated at a first time by infrared light with the first polarization of infrared light. A raw second modality image 114(1) is obtained by the camera with the polarizer that passes the first polarization of infrared light while the hand 108 is illuminated at a second time by infrared light with a second polarization. The scanner 106 may operate to produce multiple images. For example, the scanner 106 may produce a stream of images that are acquired during successive times. In this illustration, the raw image data 110 includes another raw first modality image 112(2) obtained using the first polarization of infrared light at a third time. The raw image data 110 also includes another raw second modality image 114(2) that is obtained at a fourth time using a second polarization. Additional raw first modality images 112 and raw second modality images 114 may be acquired during operation of the scanner 106.

An identification system 120 uses the raw image data 110 as input. An initial processing module 122 prepares the raw image data 110 for further processing. For example, the initial processing module 122 may determine if a particular raw image includes a human palm, determine if the raw image is in focus, determine if the raw image is properly illuminated, determine if the palm in the raw image is oriented and posed in a predetermined fashion, and so forth. The initial processing module 122 produces processed image data.

A sub-image module 124 uses the processed image data as input and divides the respective images into sub-images. A sub-image comprises a portion of an image. For example, the portion may be expressed as a rectangular area within the image. Characteristics of the sub-images, such as their relative location with respect to one another, the size of the sub-image, overlap (if any) with adjacent sub-images, and so forth may vary. For example, the processed image data of a first modality image may be divided into a set of 400 sub-images, each with a size of 256×256 pixels, while the processed image data of the second modality image may be divided into 16 sub-images, each with a size of 128×128 pixels.

The sub-image module 124 generates sub-image feature data 126 for one or more of the sub-images of at least a portion of the processed image data. In one implementation a neural network may be trained to generate feature vectors representative of one or more features present in an input image. The sub-images may be processed by one or more neural networks to generate the feature vectors for the respective sub-images. In some implementations, different neural networks may be used for second modality images and first modality images. Continuing the example above, a first neural network used to generate the feature vectors for sub-images of the first modality images may be trained to process input images with a size of 256×256 pixels. Similarly, a second neural network used to generate the feature vectors for sub-images of the second modality images may be trained to process input images with a size of 128×128 pixels. In other implementations other image sizes may be used. For example, the input images for the first modality and the second modality may be of the same size, the first modality images may have a size that is less than the second modality images, and so forth.

A comparison module 128 uses the sub-image feature data 126 and previously stored user feature data 130 to determine an identity of the user 102 based on the features present in the images of their hand 108. The stored user feature data 130 may be generated during enrollment of the user 102 to the system 100. In one implementation, an enrollment process may include acquiring and processing raw image data 110 of the hand 108 of the user 102. The sub-image feature data 126 may then be generated as described herein and used to generate the stored user feature data 130. For example, the raw image data 110 may be processed using one or more neural networks in the sub-image module 124. In one implementation, a reference signature that is representative of a user 102 being enrolled may be determined using multiple images. For example, an average feature vector may be calculated based on element-wise averaging of the feature vectors of sub-images of the same modality obtained from different images in the raw image data 110. In another implementation, the signature may be generated by concatenating the sub-image feature data 126, such as feature vectors representative of features in the sub-images, into a single linear vector. In yet another implementation, the signature may be determined using a combination of the first and second neural networks, by a third neural network, and so forth. For example, the third neural network may be configured to produce a signature based on the input of the raw image data 110.

The comparison module 128 may compare the current signature based on the feature vectors in the sub-image feature data 126 with the reference signature in the stored user feature data 130. A confidence value indicative of similarity between the current signature and the reference signature may be determined. For example, the confidence value may be determined based on a Euclidean distance in the vector space between the current signature and the reference signature. In another example, a neural network may accept as input the feature vectors or the current signature of the sub-image feature data 126 and generate data indicative of a confidence value in a match with a reference signature in the stored user feature data 130.

The comparison module 128 may also utilize a voting based approach to determine the identity of the user 102. Each user 102 that is enrolled may have stored user feature data 130 that includes one or more feature vectors or reference signatures based on those feature vectors. Based on the ongoing acquisition of raw image data 110, several current signatures may be determined and compared with the reference signatures. If a particular current signature corresponds to the reference signature within a threshold value, such as within a threshold distance in vector space, a vote is generated that is associated with that reference signature. As several current signatures continue to be determined and tested, the number of votes associated with different reference signatures may change. When one or more thresholds with respect to the votes are reached, the user identity associated with one of the reference signatures may be asserted.

A user identifier that is associated with the reference signature that is most similar may be determined to be the identity of the user 102. The comparison module 128 may produce identification data 132. For example, the user identifier associated with the reference signature may be associated with the user 102.

The identification data 132 may provide information such as one or more of a user identifier associated with the user 102, a location or identification of one or more of the gate 104 or scanner 106, data indicative of date and time that the scan was obtained, and so forth. In some implementations the identification data 132 may be subsequently used to perform various actions. For example, if the user 102 has been granted access to the facility, the identification system 120 may issue a command to the gate 104 to open. In another example, the identification data 132 may be passed to a facility management system 134.

The facility management system 134 may use the identification data 132 to associate an identity with that user 102 as they move about the facility. For example, the facility management system 134 may use data from cameras, smart floor tiles, or other sensors in the environment to determine a location of the user 102. Given a known path of the user 102 from the gate 104, the user identity indicated in the identification data 132 may be associated with the user 102 as they use the facility.

Figure 2:
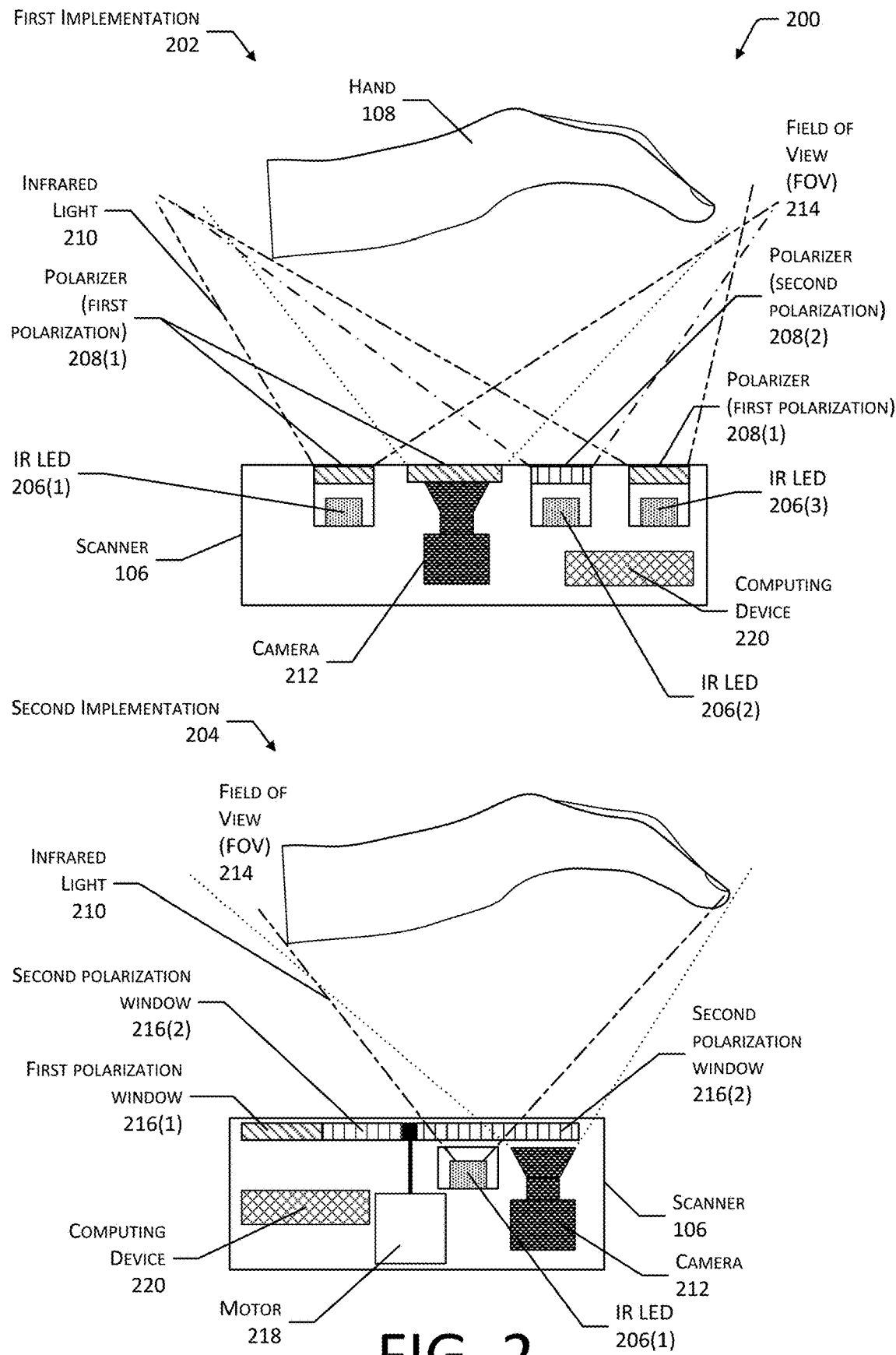
FIG. 2 illustrates implementations of a scanner used to acquire raw image data of a user's hand, according to some implementations.

FIG. 2 illustrates implementations 200 of the scanner 106 used to acquire raw image data 110 of a user's 102 hand 108, according to some implementations. A first implementation 202 and a second implementation 204 are depicted. However, it is understood that other implementations are also possible.

The first implementation 202 depicts the hand 108 of the user 102 positioned above the scanner 106. The scanner 106 may include one or more infrared (IR) light sources. For example, a first set of IR light emitting diodes (LEDs) 206(1), a second set of IR LEDs 206(2), and a third set of IR LEDs 206(3) are shown. In other implementations other devices may be used to generate infrared light. In some implementations, the wavelength of the IR light 210 may be 850 nanometers (nm).

The IR LED 206(1) is arranged adjacent to a first polarizer 208(1), such that IR light 210 produced by the IR LED 206(1) passes through the first polarizer 208(1). The IR light 210(1) that passes through the first polarizer 208(1) substantially exhibits a first polarization. Likewise, the IR LED 206(3) is arranged adjacent to a first polarizer 208(1). The scanner 106 includes a camera 212 that may also have a first polarizer 208(1), such that infrared light captured by the camera 212 substantially exhibits the first polarization. In one implementation, the camera 212 with the first polarizer 208(1) may produce the raw first modality image 112 when the hand 108 is illuminated by the light from the IR LED 206(1) with the first polarizer 208(1) that exhibits the first polarization.

In some implementations, a plurality of IR LEDs 206 with their respective polarizers 208 may be arranged at different locations in the scanner 106 relative to the camera 212. For example, four IR LEDs 206 with the first polarizers 208(1) may be arranged with one IR LED 206 at each corner of a square that is centered on the camera 212. In another implementation, the IR LEDs 206 and the polarizers 208 may form a ring around the camera 212. During operation, a computing device 220 or controller of the scanner 106 may operate the IR LEDs 206 individually or in groups to produce illumination that is either uniform or from a particular direction at different times. For example, during acquisition of raw first modality images 112, the IR LEDs 206 may be controlled to be all on during acquisition of one image at a first time. At a second time selected IR LEDs 206, such as those in a particular corner of the square, may be controlled to be on during acquisition of another image at a second time. By selectively illuminating the hand 108, external characteristics of the hand 108 such as ridges or creases may be enhanced due to shadow or other effects. For example, the controller of the scanner 106 may be configured to acquire one image using all IR LEDs 206 with the first polarization, then four images each using one of four IR LEDs 206 each at a different location with respect to the camera 212, followed by an image with the IR LED 206 that produces IR light 210 with a second polarization.

The scanner 106 includes a second IR LED 206(2) that is arranged adjacent to a second polarizer 208(2), such that the IR light 210 produced by the IR LED 206(2) passes through the second polarizer 208(2) that substantially exhibits a second polarization. In one implementation, the camera 212 may produce the raw second modality image 114 when the hand 108 is illuminated by the light from the IR LED 206(2) that exhibits the second polarization. A field of view (FOV) 214 indicates a region which is illuminated by the IR LEDs 206 and from which images from the cameras 212 may be obtained. In implementations involving multiple cameras 212, the FOV 214 is inclusive of the individual FOV of each of the cameras 212. For example, the FOV of each of the cameras 212 overlap.

During operation, a computing device 220 or controller of the scanner 106 may operate the IR LEDs 206 that produce IR light 210 with the different polarizations and the camera 212 to acquire images of the hand 108 as illuminated by the different polarizations of light. For example, at a first time the IR LED 206(1) may be active and the camera 212 acquires the raw image data 110. Continuing the example, at a second time the IR LED 206(1) may be inactive, the IR LED 206(2) may be active, and the camera 212 acquires the raw image data 110. The resulting raw image data 110 may then comprise a stream of raw first modality image 112(1), raw second modality image 114(1), raw first modality image 112(2), raw second modality image 114(2), and so forth.

The camera 212 comprises detectors that are responsive to at least the IR light 210 being used. The camera 212 may be able to generate imagery at various frame rates. For example, the camera 212 may be able to generate an image every 1/20 of a second or faster, having a frame rate of 20 frames per second (FPS). An integration time (or exposure time) of the cameras 212 specifies the amount of time that photons are measured by the detectors to generate a single image. As the integration time decreases, the system may be less prone to blurring due to motion of the hand 108.

In some implementations a polarized light source may be used, and the polarizer 208 adjacent to the light source omitted. For example, a quantum dot may emit IR light with a particular polarization. Likewise, in some implementations the camera 212 may include a detector that is sensitive to, or provides information indicative of, polarization of captured light, and the polarizer 208 omitted.

The polarizer 208 may comprise a filter that is substantially transmissive to light of a particular polarization, while substantially absorbing or reflecting light with another polarization. The polarization may be one or more of linear or circular. For example, the first polarization may be linear while the second polarization may be circular. In another example, the first polarization may be linear with a first angle and the second polarization may be linear with a second angle. When linear polarization is used, the first polarization and the second polarization may be perpendicular to one another. For example, the first polarization may exhibit a first angle of 0 degrees with respect to a particular reference point, while the second polarization exhibits a second angle of 90 degrees.

The polarizer 208 may comprise a dichroic material or structure that passes light with a linear polarization. For example, the polarizer may comprise aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, the photoelastic modulator may comprise a device that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected.

The second implementation 204 illustrates the scanner 106 that uses a light source such as one or more IR LEDs 206 and a camera 212. A wheel comprises two or more segments with polarization windows 216. For example, the wheel may comprise a first segment with a first polarization window 216(1) having a first polarizer 208(1) that passes light with a first polarity and a second segment with a second polarization window 216(2) having a portion that is a first polarizer 208 that passes light with the first polarity and a second polarizer 208(2) that passes light with a second polarity. An electric motor 218 rotates the wheel to place a particular segment in front of the IR LED 206 and the camera 212 at a particular time. For example, the rotation of the wheel may be synchronized to the frame rate of the camera 212, such that at a first time the IR light 210 from the IR LED 206 passes through the first polarization window 216(1), resulting in IR light 210 with a first polarization. That light interacts with an object, such as the hand 108, and the camera 212 with a FOV through the first polarization window 216(1) detects light passing through the first polarization window 216(1) and produces a raw first modality image 112. The first modality may thus involve using the same polarization for the infrared light 210 and the camera 112. At a second time (not shown), the second segment places a first polarization window 216(1) in front of the camera 112 and a second polarization window 216(2) in front of the IR LED 206, and the camera 212 produces a raw second modality image 114. The second modality may thus involve the infrared light 210 using a different polarization than the camera 112.

In another implementation (not depicted here) an electronically controlled device may be used to pass light with a particular polarization. For example, instead of the wheel, an electronically controlled polarizer 208 may be used to select a particular polarization at a particular time. For example, a polarized film with the first polarization 208(1) may be placed in front of the IR LEDs 206 while the electronically controlled device may be placed in front of the camera 212 to control which polarization of light reaches the detector of the camera 212 at a particular time.

In some implementations, instead of or in addition to different polarizations, different wavelengths of light may be used. For example, the IR LEDs 206 may provide illumination with a wavelength of between 740 nm and 1000 nm. In some implementations, different wavelengths may be used to illuminate the hand 108 at different times.

The scanner 106 may include one or more controllers or computing devices 220. The computing device 220 may include a hardware processor, memory, and so forth. For example, the computing device 220 may comprise a microcontroller, system on a chip (SoC), single board computer, and so forth. The computing device 220 may be configured to operate the devices of the scanner 106. For example, the computing device 220 may operate the IR LEDs 206, the polarizers 208 (where electronically controlled), the cameras 212, the motor 218 driving a polarizer wheel, and so forth. For example, the computing device 220 may control the scanner 106 such that raw image data 110 is generated that comprises raw first modality images 112 acquired at a first time using a first polarization of IR light 210 and raw second modality images 114 acquired at a second time using a second polarization of IR light 210.

In some implementations one or more of the functions of the identification system 120 may be performed by the one or more computing devices 220. For example, the scanner 106 may use the one or more computing devices 220 to implement the initial processing module 122. In this implementation, the scanner 106 may send processed image data to the identification system 120.

In other implementations the relative arrangement of the hand 108 and the scanner 106 may be changed. For example, the scanner 106 may be oriented such that a FOV 214 is pointed down. During use, the user 102 may position their hand 108 below the scanner 106, in the FOV 214 with their palm opening upwards.

While the scanner 106 is described as being used to acquire an image of the palm of the hand 108, the scanner 106 may be used to acquire images of other portions of the user 102, such as of the back of the hand 108, face, and so forth. For example, the scanner 106 may be arranged with a FOV 214 such that as a user 102 approaches the gate 104, raw image data 110 of their face is obtained that includes raw first modality images 112 of the face and raw second modality images 114 of the face.

Figure 3:
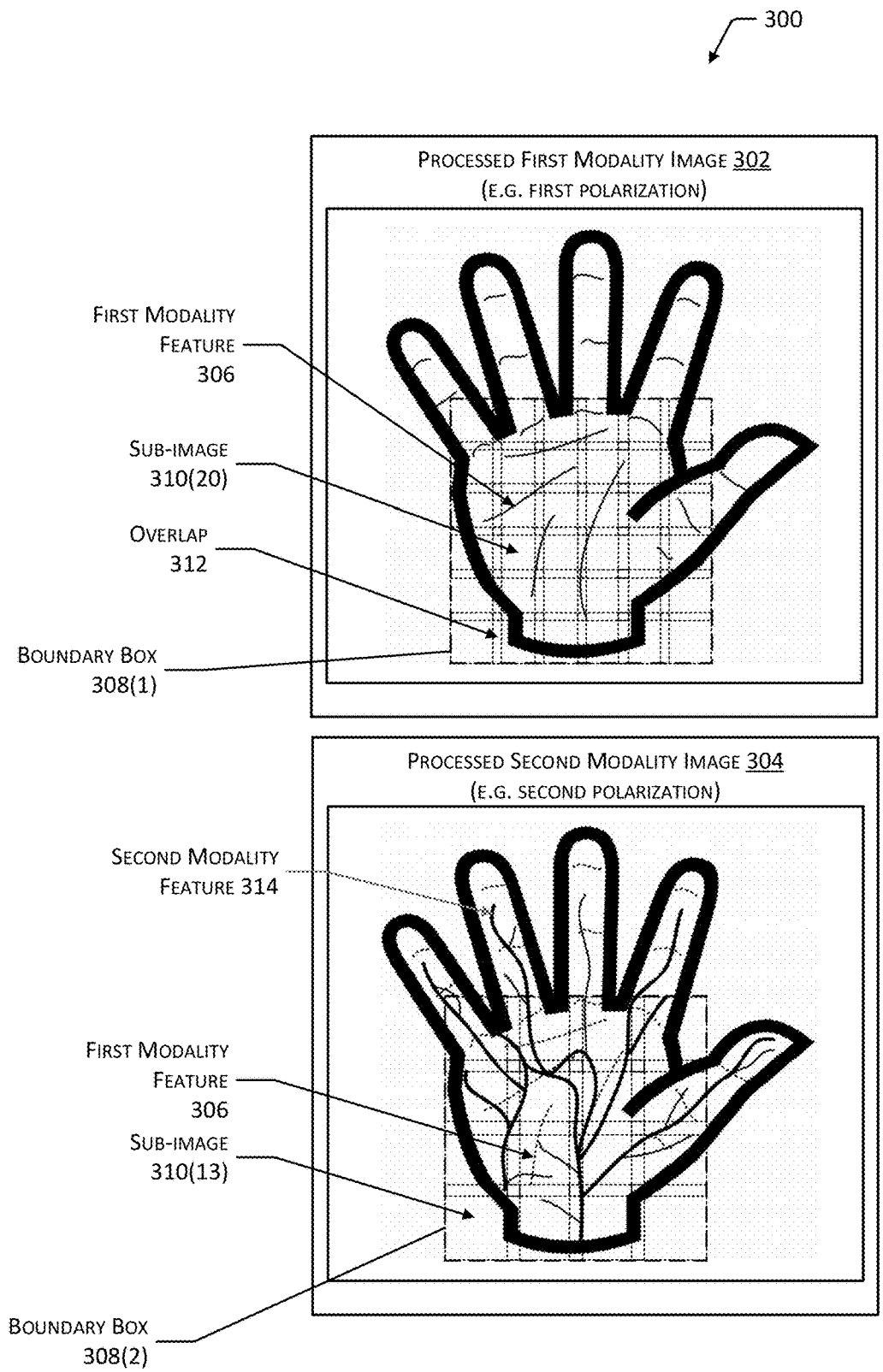
FIG. 3 illustrates a processed first modality image obtained using light with a first polarization and a processed second modality image obtained using light with a second polarization, according to some implementations.

FIG. 3 illustrates 300 a processed first modality image 302 obtained using light with a first polarization and a processed second modality image 304 obtained using light with a second polarization, according to some implementations. The processed images may be determined by the initial processing module 122. Operation of the initial processing module 122 is discussed in more detail below with regard to FIG. 4.

The processed first modality image 302 depicts various first modality features 306, such as creases and folds in the skin of the palm. A boundary box 308(1) is depicted. For example, the initial processing module 122 may generate a boundary box 308 that designates an area within the image that the palm of the hand 108 is deemed to be present. The sub-image module 124 may divide the area of the processed first modality image 302 that is within the boundary box 308(1) into a plurality of sub-images 310 or patches. In the implementation depicted here, the sub-images 310 overlap 312 with adjacent sub-images 310. In other implementations, the sub-images 310 may be disjointed and exhibit no overlap 312. As depicted here, the size of the sub-images 310 determined by the sub-image module 124 may be the same. For example, each sub-image 310 may represent an area that is 256 rows and 256 columns of pixels. However, in other implementations different sub-images 310 may have different sizes. For example, one sub-image 310 may be 256×256 pixels, while another sub-image 310 may be 128×128 pixels.

The processed second modality image 304 depicts various second modality features 314, such as veins underneath the skin. In some implementations the processed second modality image 304 may also depict some first modality features 306, such as a crease. A boundary box 308(2) is shown that designates an area within the image that the palm of the hand 108 is deemed to be present. Within the boundary box 308(2), the processed second modality image 304 is divided into sub-images 310. In other implementations, the boundary box 308 may include the entire hand 108, or another portion thereof, such as the fingers.

In some implementations, the coordinates of a boundary box 308 determined for either of the processed first modality image 302 or the processed second modality image 304 may be used for the other image, eliminating a need to determine the boundary box 308 twice. For example, given that the processed first modality image 302 and the processed second modality image 304 are acquired at a first time and a second time that are within a threshold time of one another, the amount of movement of the hand 108 in the image data between images may be small. In another example, if the processed first modality image 302 and the processed second modality image 304 are otherwise aligned with respect to one another, the boundary box 308 determined for one image may be reused for the other, reducing the computational resources used by the system 100.

The number of sub-images 310 that a first modality image is divided into may differ from the number of sub-images 310 that a second modality image is divided into. For example, the processed first modality image 302 may be divided into 36 sub-images while the processed second modality image 304 may be divided into 16 sub-images.

The sub-images 310 for a particular type of image, such as second modality or first modality, may comprise an array of m rows and n columns, where m and n are non-zero integer values. The number of rows may differ from the number of columns. For example, the raw first modality images 112 may be divided into 10 columns and 20 rows.

The resolution used to resolve first modality features 306 and second modality features 314 may vary. For example, first modality features 306 may exhibit high frequency components such as sharp edges of a crease in the palm. In comparison, second modality features 314 such as veins may be blurred due to scattering of the IR light 210 by intervening tissue. This difference may be used to reduce the consumption of computer resources and also to reduce latency while processing the data. In one implementation, the processed first modality image 302 may have a greater overall resolution than the processed second modality image 304. The initial processing module 122 may downsample the raw second modality image 114 to produce the processed second modality image 304. For example, a linear downsampling function or a bicubic downsampling function may be used to produce the processed second modality image 304. As a result, the resolution of the processed second modality image 304 may be less than that of the processed first modality image 302.

Also depicted is that the raw image data 110 has been processed such that the hand 108 within the processed first modality image 302 and the processed second modality image 304 are both aligned to a canonical orientation. For example, the image of the hand 108 has been rotated to a particular orientation in which a long axis of the palm extends along a centerline of the images.

As illustrated, one or more of the processed first modality image 302 or the processed second modality image 304 may depict the entire hand 108, such as from the wrist to the fingertips. This information may be used as described below. For example, the image of the entire hand may be used to determine information about geometry of the hand 108, such as overall pose and orientation of the hand 108. In some implementations, the entire hand may be processed as described below, and features present on the fingers and thumb may be determined and compared. For example, the entire surface of the user's hand including fingers may be subdivided into sub-images 310. External characteristics and internal characteristics of the fingers and thumb may be used instead of or in conjunction with the features of the palm to identify the user 102.

Figure 4:
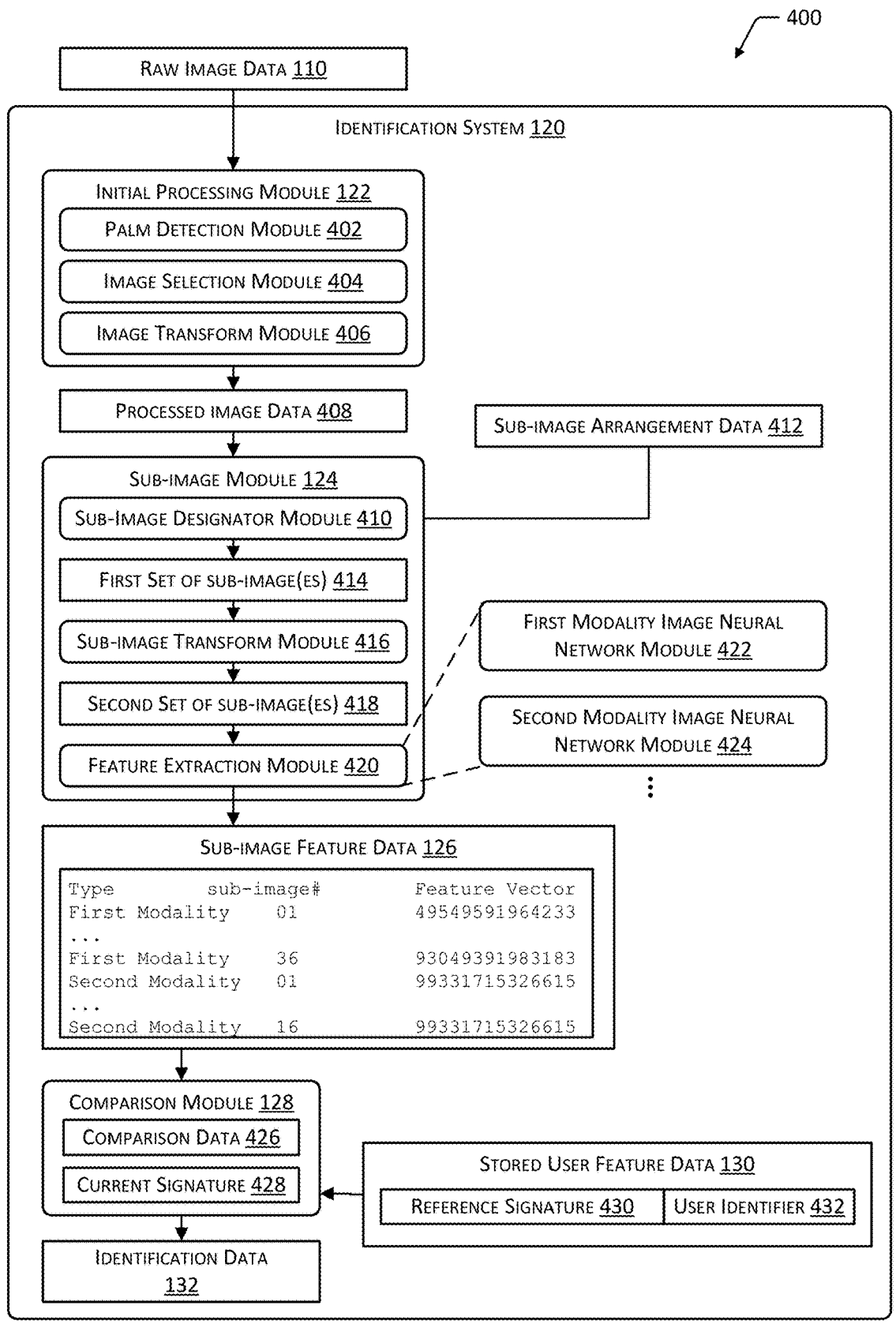
FIG. 4 is a block diagram of an identification system, according to some implementations.

FIG. 4 is a block diagram 400 of the identification system 120, according to some implementations. As described above, the raw image data 110 obtained by the scanner 106 is provided to the identification system 120. The raw image data 110 comprises one or more raw first modality images 112 obtained using light with a first polarization and one or more raw second modality images 114 obtained using light with a second polarization.

The initial processing module 122 may include one or more modules, such as a palm detection module 402, image selection module 404, or image transform module 406. The initial processing module 122 produces as output processed image data 408.

The palm detection module 402 may be configured to determine if a palm is present in an image of the raw image data 110. If a palm is determined to be present, the module may determine the boundary box 308. In one implementation, the palm detection module 402 may comprise an image classifier that has been trained to detect palms. In another implementation, the palm detection module 402 may comprise an artificial neural network. In some implementations, the initial processing module 122 may determine the presence of a hand 108 instead of, or in addition to, the palm. The palm detection module 402 may also produce data indicative of which hand 108 the user 102 has presented. For example, the palm detection module 402 may determine if a left hand or a right hand is depicted. In one implementation the palm detection module 402 may utilize a classifier to determine whether a left or right hand is depicted. In another implementation, the palm detection module 402 may utilize a neural network to determine whether a left or right hand is depicted.

The image selection module 404 may process the raw images that have been determined to include a palm by the palm detection module 402. The image selection module 404 may be configured to determine which of the raw images that include a palm are suitable for further processing. Images may be deemed suitable for further processing if they exhibit a specific orientation of the palm, exhibit a specific pose of the palm, exhibit overall brightness above a first threshold value, exhibit overall blur that is below a second threshold, and so forth. For example, a preferred canonical orientation of the palm may be that a long axis of the palm is within a threshold angle with respect to the image. A preferred canonical pose of the palm that is deemed suitable may comprise a pose in which the palm is substantially flat with the fingers not obscuring the palm.

Average brightness of the image may be calculated and used to determine a percentage of the area within the boundary box 308 that is over-saturated or under-saturated. If the average brightness is above the first threshold value, the image may be deemed sufficiently bright.

Overall blur of the image may be determined using one or more techniques. In one implementation, the area within the boundary box 308 may be divided into smaller patches or sub-images 310. A normalized mean and contrast of the pixel intensity values in one or more of the patches may be calculated. A Fourier transform may be calculated using the intensity values of the pixels in the one or more patches. Using the data from the Fourier transform an energy representative of the intensity within a specified range of frequencies may be computed. If the energy is less than a threshold value, the patch may be deemed to be blurry or out of focus. By using the spatial distribution of this energy measurement for a plurality of patches across the palm, the system may also estimate the flatness of the palm. For example, if the energy values for the patches are within a threshold value of one another, the pose of the hand 108 may be deemed to be that of a flattened palm. In other implementations, other techniques may be used to determine focus. For example, an edge detection module may be used to determine the presence of one or more edges in a patch and determine an edge score representative of how quickly the intensity of adjacent pixels changes. If the edge score exceeds a threshold value, the patch may be deemed to be in focus. If a threshold number of patches are deemed to be in focus, the overall image may be deemed to be in focus.

In other implementations, the initial processing module 122 may include other modules that further filter or process the raw image data 110. The initial processing module 122 may also provide output that is presented to the user 102 via one or more output devices such as a display, lights, speakers, and so forth. The initial processing module 122 may use this output to direct the user 102 to place their hand 108 in one or more of a particular orientation, pose, or position with respect to the scanner 106. For example, a display device at the gate 104 may provide a visual cue to the user 102 to place their hand 108 in a particular fashion.

The image transform module 406 may process those images in the raw image data 110 that have been determined to be suitable for further processing as described above. The image transform module 406 may apply one or more transforms to the images and produce the processed image data 408. These transforms may include but are not limited to, rectification, translation, rotation, warping, filters, and so forth. For example, the image transform module 406 may apply a rectification transform, mapping one or more pixels from one location in the raw image to a different location in the processed image. As a result of rectification, a plane of the palm of the hand 108 may appear to be within the plane of the processed image. In another example, the image transform module 406 may apply a rotation function, re-orienting the image of the hand 108 to a particular canonical orientation. Continuing the example, a canonical orientation may comprise the hand oriented so that a long axis of the palm is directed at a particular angle with respect to the re-oriented image.

In some implementations the image transform module 406 may register or align the first modality and second modality images to one or more common points. For example, because of movement of the hand 108 between acquisition of the raw images by the camera 212, the apparent position of the hand 108 may move slightly between a pair of first modality and second modality images. The image transform module 406 may translate or otherwise map the pixels in the respective images to a common point, producing a pair of images that are aligned or registered with respect to one another.

The processed image data 408 may thus contain processed first modality images 302 and processed second modality images 304 in which the respective images include a picture of a palm, are oriented in a particular direction, exhibit a particular canonical pose, are sufficiently bright, and are sufficiently in focus for further processing.

In one implementation the initial processing module 122 may progressively filter and process the raw image data 110 to produce the processed image data 408. For example, for the second modality and first modality raw image data 110, the initial processing module 122 may determine a first set of images from the raw image data 110 that are representative of a human palm. From the first set of images, a second set of images that are representative of a specific orientation of the human palm may be determined. From the second set of images, a third set of images that are representative of a specific pose of the human palm are determined. One or more transforms may be applied to the images in the third set of images to produce the processed image data 408.

In some implementations the initial processing module 122 may determine a model of the hand 108. For example, the model may represent one or more of the hand's 108 orientation, pose, or position with respect to the scanner 106. In some implementations the model may be representative of articulation of the palm and one or more finger joints. For example, the model of the hand 108 may be representative of the palm and disregard distal finger joints from consideration. In some implementations palm deformation from an idealized plane may be represented by a piece-wise affine algorithm. Information from the model may be used by other portions of the identification system 120. For example, model information about the curvature of particular areas on the palm may be used by a sub-image transform module 416 as described below.

The sub-image module 124 accepts as input the processed image data 408. The sub-image module 124 includes a sub-image designator module 410 that uses as input sub-image arrangement data 412. The sub-image arrangement data 412 may specify, for a particular type of images, such as second modality or first modality, a size and position for the sub-images 310 of that type of image. For example, the sub-image arrangement data 412 may specify that the area within the boundary box 308 for first modality images are to be divided into 400 sub-images 310, while the area within the boundary box 308 for second modality images are to be divided into 100 sub-images 310. In another example, the sub-image arrangement data 412 may specify sub-images 310 for the entire hand 108, including the palm and the fingers. The first set of sub-images 414 may comprise sub-images 310 of processed first modality images 302 and sub-images 310 of processed second modality images 304.

A sub-image transform module 416 may be used to apply one or more transforms to the sub-images 310 to produce a second set of sub-images 418. These transforms may include but are not limited to, rectification, translation, rotation, warping, filters, and so forth. For example, due to a curve in the surface of the palm as indicated by a model of the hand 108, the sub-image transform module 416 may rectify a particular sub-image 310 by remapping pixels from one location to another to "flatten out" that sub-image 310. By applying one or more transforms to particular sub-images 310, the sub-image transform module 416 improves the accuracy of the identification system 120. For example, by applying a transform to rectify a particular sub-image 310, the system is better able to determine and utilize the information about the features present in that sub-image 310. The sub-image transform module 416 may apply other transformations, such as rotation, translation, and so forth. In some implementations the sub-image transform module 416 may warp or transform a sub-image 310 onto a "reference hand" or canonical model of the hand 108 that is in a particular orientation, pose, and so forth. The sub-image transform module 416 may be omitted in some implementations. For example, a convolutional neural network may operate on the sub-images 310 that makes the application of separate transforms unnecessary.

The second set of sub-images 418 comprises sub-images 310 of the first modality and second modality images. A feature extraction module 420 processes the second set of sub-images 418 and generates the sub-image feature data 126. The sub-image feature data 126 comprises feature vectors that are representative of the features present in a sub-image 310.

One or more neural networks may be used to process a sub-image 310 and produce as output feature vectors. The neural networks may be trained to detect stable features in sub-images 310. The sub-image 310 is processed by the neural network to produce a k-dimensional feature vector or embedded vector, where k is a non-zero integer value. In some implementations the configuration of the neural network may define the value of k.

In some implementations, during training the neural network may implement a triplet loss function for training. The triplet loss function results in the network suppressing a distance in the vector space between images of the same user 102 while also increasing a distance in the vector space between images from different users 102. For example, the neural network may implement a residual network (resnet) with 18 layers that implements the triplet loss function during training. Once trained, the neural network may subsequently be used to process the sub-images 310 and generate feature vectors.

Different neural networks may be used to process second modality images and first modality images. Each of these neural networks may be trained and configured to operate using input, such as sub-images 310 with a particular size. For example, the sub-images 310 of the first modality images may have a higher resolution than the sub-images 310 of the second modality images. The use of different neural networks may improve overall performance by better determining features specific to a particular modality and reduce latency during operation. For example, a neural network that is configured and trained to process the sub-images 310 of a specific resolution and modality may require fewer computational resources and require less time to produce output than a neural network that is configured and trained to process multiple resolutions and multiple modalities.

A first modality image neural network module 422 may be used to process sub-images 310 in the second set of sub-images 418 that are based on first modality images. For example, the first modality image neural network module 422 may be trained using sub-images 310 from first modality images. The output from the trained first modality image neural network module 422 may comprise a feature vector expressed in an n dimensional space, where n is a non-zero integer value.

A second modality image neural network module 424 may be used to process sub-images 310 in the second set of sub-images 418 that are based on second modality images. For example, the second modality image neural network module 424 may be trained using sub-images 310 from second modality images. The output from the trained first modality image neural network module 422 may comprise a feature vector expressed in a p dimensional space, where p is a non-zero integer value. In some implementations, p may be less than n.

In some implementations sub-images 310 in the second set of sub-images 418 may be used at different resolutions. For example, sub-images 310 of the first modality at a first resolution (fine) and sub-images 310 of the first modality at a second resolution (coarse) that is less than the first may be processed. In some implementations, these different resolutions may be processed by a respective neural network that is trained to operate at that resolution. Continuing the example, a fine first modality image neural network module may process the sub-images 310 at the first resolution while a coarse first modality image neural network module may process the sub-images 310 at the second resolution.

The sub-image feature data 126 comprises feature vectors associated with particular types of sub-images 310 and may be indicative of the relative location of the sub-image 310. For example, the sub-image feature data 126 may indicate a feature vector value for a particular sub-image 310(01) of a particular first modality image. Continuing the example, feature vectors may be generated for one or more of the sub-images 310 associated with a particular image in the processed image data 408.

A comparison module 128 accepts as input at least a portion of the sub-image feature data 126 and the stored user feature data 130. In one implementation, comparison data 426 may be generated that compares the feature vectors in the sub-image feature data 126 with previously stored user feature data 130. In another implementation, the comparison module 128 may generate a current signature 428 based on the feature vectors. The current signature 428 may then be compared to one or more previously stored reference signatures 430 in the stored user feature data 130 to generate the comparison data 426. Each reference signature 430 may be associated with a user identifier 432.

The comparison module 128 may use the sub-image feature data 126 to generate the current signature 428. The current signature 428 may be generated using feature vectors obtained from one or more images. For example, the feature vectors resulting from processing of the raw first modality image 112(1) may be determined and the feature vectors resulting from processing the raw second modality image 114(1) may be determined. These feature vectors may then be combined to form a current signature 428 that is based on the pair of images. In one implementation, the current signature 428 may be generated by concatenating the one or more feature vectors in the sub-image feature data 126 to form a linear vector. In another implementation, a convolutional neural network may accept the feature vectors as input and produce as output the current signature 428.

During operation, the comparison module 128 may generate a plurality of current signatures 428 that are based on the processing of raw image data 110 that continues to be acquired by the scanner 106. For example, the sub-image feature data 126 may include feature vectors from 20 pairs of raw first modality images 112 and raw second modality images 114. Each pair may be used to generate a current signature 428. Each of these 20 current signatures 428 may be compared to one or more reference signatures 430. In one implementation a voting system may be utilized, such that the user identity is deemed to be the user identifier 432 that is associated with the largest number of votes. For example, if the current signature 428 corresponds to the reference signature 430 within a threshold value, such as within a threshold distance in vector space, a vote is generated that is associated with that reference signature 430. Continuing the example, if there are 15 votes for a user identifier 432 of "Alice" and 5 votes for a user identifier 432 of "Greg". The identification data 132 would then indicate the user identifier 432 of "Alice".

The comparison module 128 may generate comparison data 426 that comprises confidence values indicative of how closely a current signature 428 corresponds to a reference signature 430 in the stored user feature data 130 that is associated with a candidate user identifier 432. In one implementation, the confidence value may be determined based on a Euclidean distance in the vector space between the current signature 428 and the reference signature 430. The confidence value may be proportionate to the distance, such that a higher confidence value is indicative of a smaller distance and a lower confidence value is indicative of a greater distance.

In some implementations, search space reduction data may be used to reduce the set of reference signatures 430 in the stored user feature data 130 that are compared to the current signatures 428 that are produced from the sub-image feature data 126. The search space reduction data may comprise information such as geolocation data provided by an application executing on a mobile device of the user 102. For example, the user 102 may have installed an application on their smartphone. As the smartphone passes a predetermined geographic boundary (such as a geofence) near the facility, the user identifier 432 associated with the user 102 may be added to a list of candidate user identifiers that may be expected at the gate 104 as stored in the search space reduction data. As the user 102 moves away, they may be removed from the list of candidate user identifiers in the search space reduction data. The search space reduction data may also include other information, such as historical attendance data based on location, date, time, and so forth. For example, the search space reduction data may indicate that each weekday during a window of time a particular user identifier 432 is present at a particular facility.

The comparison module 128 may initially compare the current signatures 428 with the reference signatures 430 of those user identifiers 432 listed in the search space reduction data. By performing the comparison using the reference signatures 430 associated with the search space reduction data, the overall accuracy of the system may be improved. Use of the search space reduction data may also reduce time and computational resources needed to determine identity. If no suitable match is found, the system may search the remaining stored user feature data 130.

The comparison module 128 uses the comparison data 426 to generate the identification data 132. For example, a candidate user identifier that has comparison data 426 indicating a highest ranked confidence value for matches between reference signatures 430 and the current signatures 428 from both the first modality and second modality images may be designated as the user identifier 432 associated with the user 102 at the gate 104 who presented their hand 108 to the scanner 106. Other techniques for determining the user identifier 432 associated with the user 102 are discussed below with regard to FIGS. 6-8.

By way of illustration, and not necessarily as a limitation, the identification system 120 is depicted as implementing the various modules and functions described above. In some implementations, at least some of the processing of the identification system 120 may be performed by the computing device 220 of the scanner 106. For example, the computing device 220 may be configured to perform the functions of the initial processing module 122 and send the processed image data 408 to the identification system 120. In another example, the computing device 220 may be configured to perform the functions of the sub-image module 124, and provide sub-image feature data 126 to the identification system 120.

In some implementations, sub-images 310 at particular locations for a particular type of image may be assigned different weights. For example, a particular first modality sub-image 310 may be deemed to contain features that are significant for identification, and this first modality sub-image may be associated with a particular first modality weight value. By multiplying the confidence values and the respective first modality weight values, a first modality score may be determined for a particular first modality image. Likewise, a second modality score may be determined for a particular second modality image. The first modality image and the second modality image may be images that were obtained during a threshold time of one another. For example, the first modality score may be based on the first modality sub-images 310 from the raw first modality image 112(1) obtained at a first time and the second modality score may be based on the second modality sub-images 310 from the raw second modality image 114(1) obtained at a second time. An overall score may be determined based on the first modality score and the second modality score. This weighting is discussed in more detail with regard to FIG. 5.

The system as described is resistant to spoofing or counterfeiting. The use of images acquired in the first modality and the second modality, the ongoing acquisition of images, and the acquisition of these images with the different modalities at close times significantly reduces the likelihood that an imposture would be successful. For example, a picture of the user's 102 hand 108 would omit the internal characteristics such as veins. Additionally, variation between images may be expected and tested for. If the successive images are too similar, the reliability of the identification may be decreased. Continuing the example, the presentation of a picture would result in very similar or identical feature vectors. In comparison, presentation of a living hand 108 will include some variable due to movement and so forth. A minimum threshold of variation between the feature values determined from successive images of the same modality may be tested for. Insufficient variability may result in a decrease in the confidence value of the subsequent identification.

Figure 5:
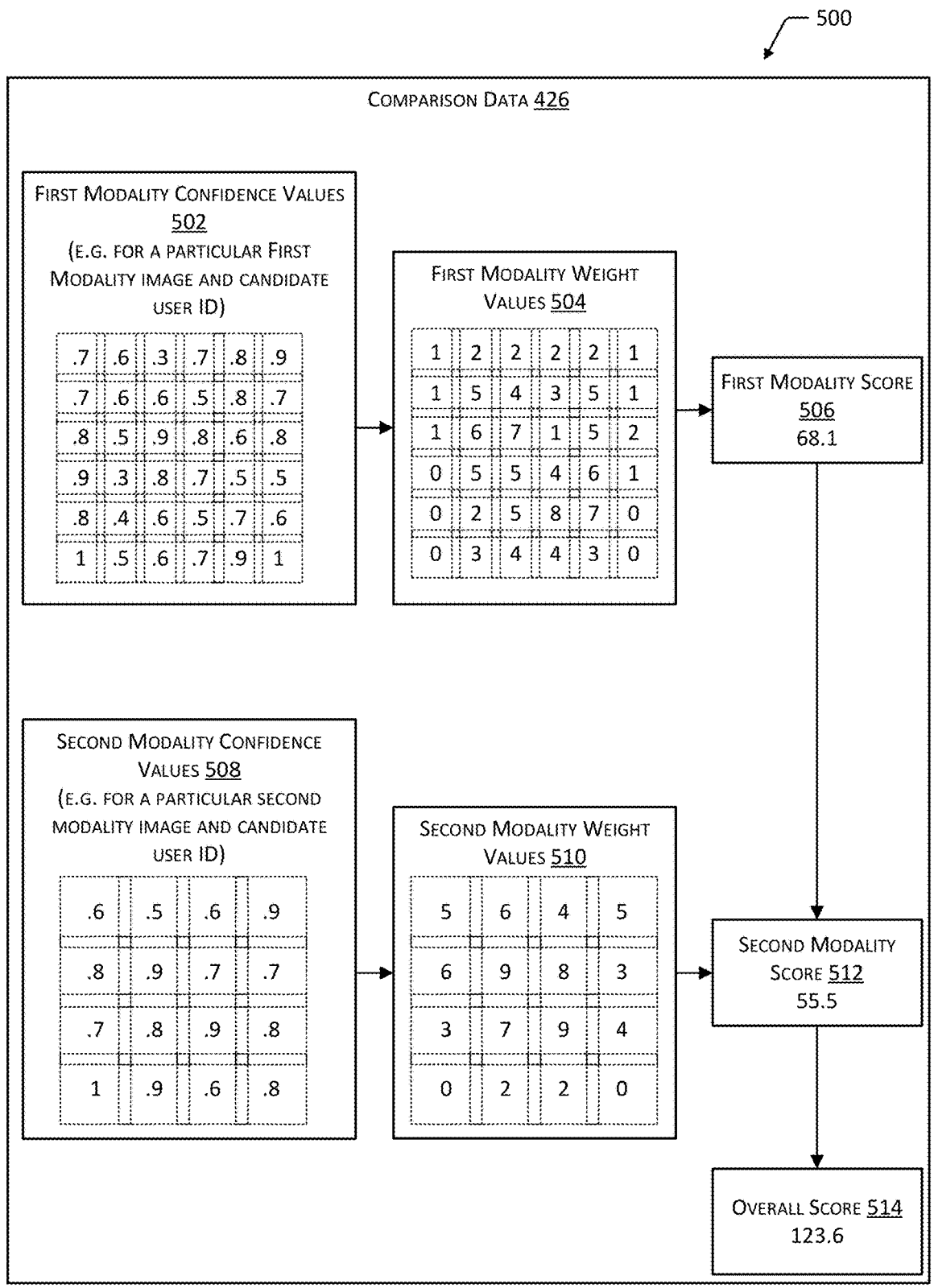
FIG. 5 illustrates comparison data including confidence values associated with first modality and second modality images and the use of modality weights associated with particular sub-image locations, according to some implementations.

FIG. 5 illustrates 500 comparison data 426 including confidence values associated with first modality and second modality images and the use of modality weights associated with particular sub-image locations, according to some implementations.

As described above, some sub-images 310 may be associated with features that are of greater or lesser interest when determining user identity. For example, a particular sub-image 310 in a first modality image may be similar to a large number of users, rendering the features in that sub-image 310 to be of little use in distinguishing one user 102 from another. In another example, a particular sub-image 310 in a second modality image may be associated with features that are highly distinctive between different users 102.

As depicted above, the comparison module 128 may generate confidence values indicative of a similarity between the feature vectors of particular sub-images 310 produced from the raw image data 110 and feature vectors associated with a candidate user identifier in previously stored user feature data 130. For example, the confidence value may be determined based on a Euclidean distance in the vector space between the feature vectors being compared. The confidence value may be proportionate to the distance, such that a higher confidence value is indicative of a smaller distance and a lower confidence value is indicative of a greater distance.

An array of confidence values may thus be determined for both the first modality and second modality images. In this illustration, first modality confidence values 502 are shown for a particular first modality image. Previously defined first modality weight values 504 are also shown, that indicate a respective weight that is associated with particular sub-images 310. A first modality score 506 is shown. In one implementation, the first modality score 506 may be calculated as a sum of the products of the first modality confidence values 502 and corresponding first modality weight values 504. In other implementations, other calculations may be used.

Also shown are second modality confidence values 508 and corresponding second modality weight values 510. A second modality score 512 is shown. In one implementation, the second modality score 512 may be calculated as a sum of the products of the second modality confidence values 508 and corresponding second modality weight values 510. In other implementations, other calculations may be used.

An overall score 514 may be calculated. For example, the overall score 514 may comprise a sum of the first modality score 506 and the second modality score 512. In other implementations, other calculations may be used to determine the overall score 514.

In one implementation, the candidate user identifier that is associated with the greatest overall score 514 may be selected and used to generate the identification data 132. For example, if a first candidate user identifier has an overall score of 123.6 and a second candidate user identifier has an overall score of 101.3, the first candidate user identifier may be selected. The identification data 132 would then indicate that the user 102 is the first candidate user identifier.

While a single set of first modality confidence values 502 and second modality confidence values 508 are depicted, additional instances of confidence values for one or more of the first or second modalities may be used. For example, based on raw image data 110, five separate raw first modality images 112 may be acquired, and five separate raw second modality images 114 may be acquired. Confidence values for the sub-images 310 of each may be determine, and the individual modality scores used to generate the overall score 514.

Figure 6:
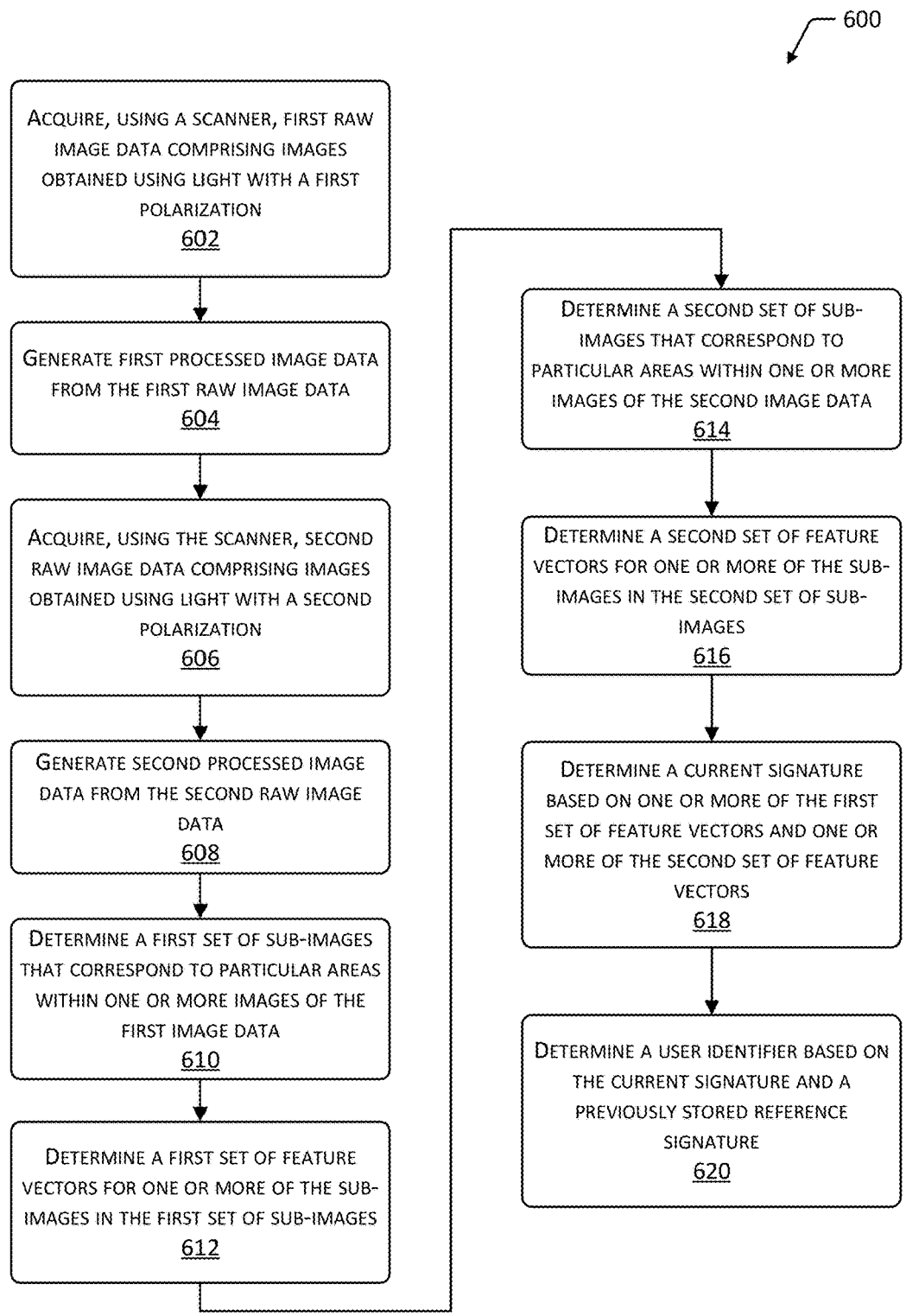
FIG. 6 illustrates a flow diagram of a process to determine a user identifier based on images obtained by the scanner, according to some implementations.

FIG. 6 illustrates a flow diagram 600 of a process to determine a user identifier 432 based on images obtained by the scanner 106, according to some implementations. The process may be implemented at least in part by the identification system 120.

At 602, using a scanner 106, first raw image data 110(1) is acquired at a first time. The first raw image data 110(1) comprises images obtained using light with a first polarization.

At 604 first processed image data 408(1) is generated from the first raw image data 110. For example, the initial processing module 122 may process the first raw image data 110(1) and generate the processed image data 408.

At 606, using the scanner 106, second raw image data 110(2) is acquired at a second time. The second raw image data 110(2) comprises images obtained using light with a second polarization.

At 608 second processed image data 408(2) is generated from the second raw image data 110(2). For example, the initial processing module 122 may process the second raw image data 110(2) and generate the processed image data 408(2).

At 610, a first set of sub-images 414 are determined. Individual ones of the sub-images 310 correspond to particular areas within one or more images of the first processed image data 408(1). For example, the sub-image designator module 410 may use the sub-image arrangement data 412 to divide processed images into sub-images 310. The sub-images 310 may comprise sub-images 310 of first modality images.

At 612, a first set of feature vectors are determined for one or more of the sub-images 310 in the first set of sub-images 414. In one implementation, the feature extraction module 420 may use a first neural network to determine the first set of feature vectors. For example, the first modality image neural network module 422 may be used to generate the first set of feature vectors.

At 614, a second set of sub-images 418 is determined. Individual ones of the sub-images 310 correspond to particular areas within one or more images of the second processed image data 408(2). For example, the sub-image designator module 410 may use the sub-image arrangement data 412 to divide processed images into sub-images 310. The sub-images 310 may comprise sub-images 310 of second modality images.

At 616, a second set of feature vectors are determined for one or more of the sub-images 310 in the second set of sub-images 418. In one implementation, the feature extraction module 420 may use a second neural network to determine the second set of feature vectors. For example, the second modality image neural network module 424 may be used to generate the second set of feature vectors.

At 618 a current signature 428 is determined based on one or more of the first set of feature vectors and one or more of the second set of feature vectors. The current signature 428 is representative of the features presented by the user 102 at the gate 104. For example, the first set of feature vectors and the second set of feature vectors may be concatenated into a single linear vector. In another example the first set of feature vectors and the second set of feature vectors may be provided as inputs to a neural network which produces the current signature 428. Continuing the example, a convolutional neural network may accept as input at least a portion of the first set of feature vectors and at least a portion of the second set of feature vectors and produce the current signature 428. In some implementations the current signature 428 may have a lower dimensionality than the feature vectors.

At 620 a user identifier 432 is determined based on previously stored user feature data 130 that includes a reference signature 430. In one implementation, the comparison module 128 may determine confidence values that indicate a similarity between the current signature 428 and the reference signatures 430 that are in the stored user feature data 130. In another implementation, the comparison module 128 may determine confidence values that indicate a similarity between the feature vectors obtained from the raw image data 110 and the feature vectors in the stored user feature data 130. The confidence value may be determined based on a Euclidean distance in the vector space between the signatures, feature vectors, and so forth. The confidence value may be proportionate to the distance, such that a higher confidence value is indicative of a smaller distance and a lower confidence value is indicative of a greater distance.

Figure 7:
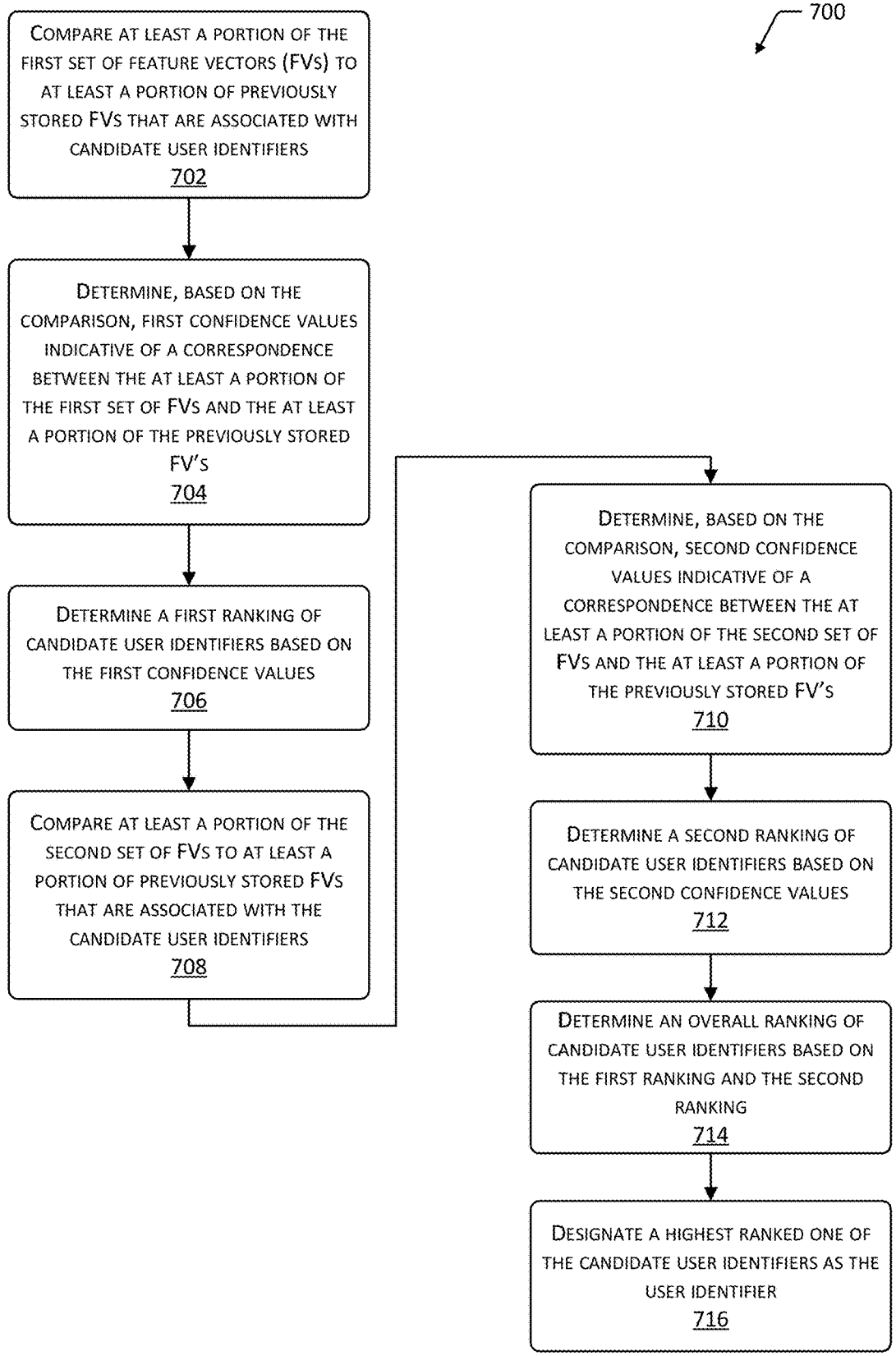
FIG. 7 illustrates a flow diagram of a process to rank and select a particular candidate user identifier based on rankings of confidence values of sub-images of second modality and first modality images, according to some implementations.

FIG. 7 illustrates a flow diagram 700 of a process to rank and select a particular candidate user identifier based on rankings of confidence values of sub-images of second modality and first modality images, according to some implementations. The process may be implemented at least in part by the identification system 120.

At 702, at least a portion of the first set of feature vectors based on the processed image data 408 are compared to at least a portion of previously stored feature vectors in the stored user feature data 130. The previously stored feature vectors are associated with candidate user identifiers. For example, the feature vectors based on the raw second modality images 114 may be compared to stored feature vectors based on raw second modality images 114 obtained during enrollment of the user 102.

At 704, based on the comparison, first confidence values are determined that are indicative of a correspondence between at least a portion of the first set of feature vectors and at least a portion of the previously stored feature vectors. For example, a Euclidean distance in vector space may be determined between feature vectors in the first set and previously stored feature vectors. In other implementations, other techniques may be used.

At 706, a first ranking of candidate user identifiers is determined based on the first confidence values. For example, the ranking may comprise a descending sort.

At 708, at least a portion of the second set of feature vectors based on the processed image data 408 are compared to at least a portion of previously stored feature vectors in the stored user feature data 130. The previously stored feature vectors are associated with the candidate user identifiers. For example, the feature vectors based on the raw first modality images 112 may be compared to stored feature vectors based on raw first modality images 112 obtained during enrollment of the user 102.

At 710, based on the comparison, second confidence values are determined that are indicative of a correspondence between at least a portion of the second set of feature vectors and at least a portion of the previously stored feature vectors. For example, a Euclidean distance in vector space may be determined between feature vectors in the second set and previously stored feature vectors.

At 712, a second ranking of candidate user identifiers is determined based on the second confidence values. For example, the ranking may comprise a descending sort.

At 714, an overall ranking of candidate user identifiers is determined based on the first ranking and the second ranking. For example, if a particular candidate user identifier is associated with a highest ranked position in the first ranking and the second ranking, that particular candidate user identifier would have the highest overall ranking.

At 716, a highest ranked one of the candidate user identifiers in the overall ranking is designated as the user identifier 432 associated with the user 102 of the scanner 106.

Figure 8:
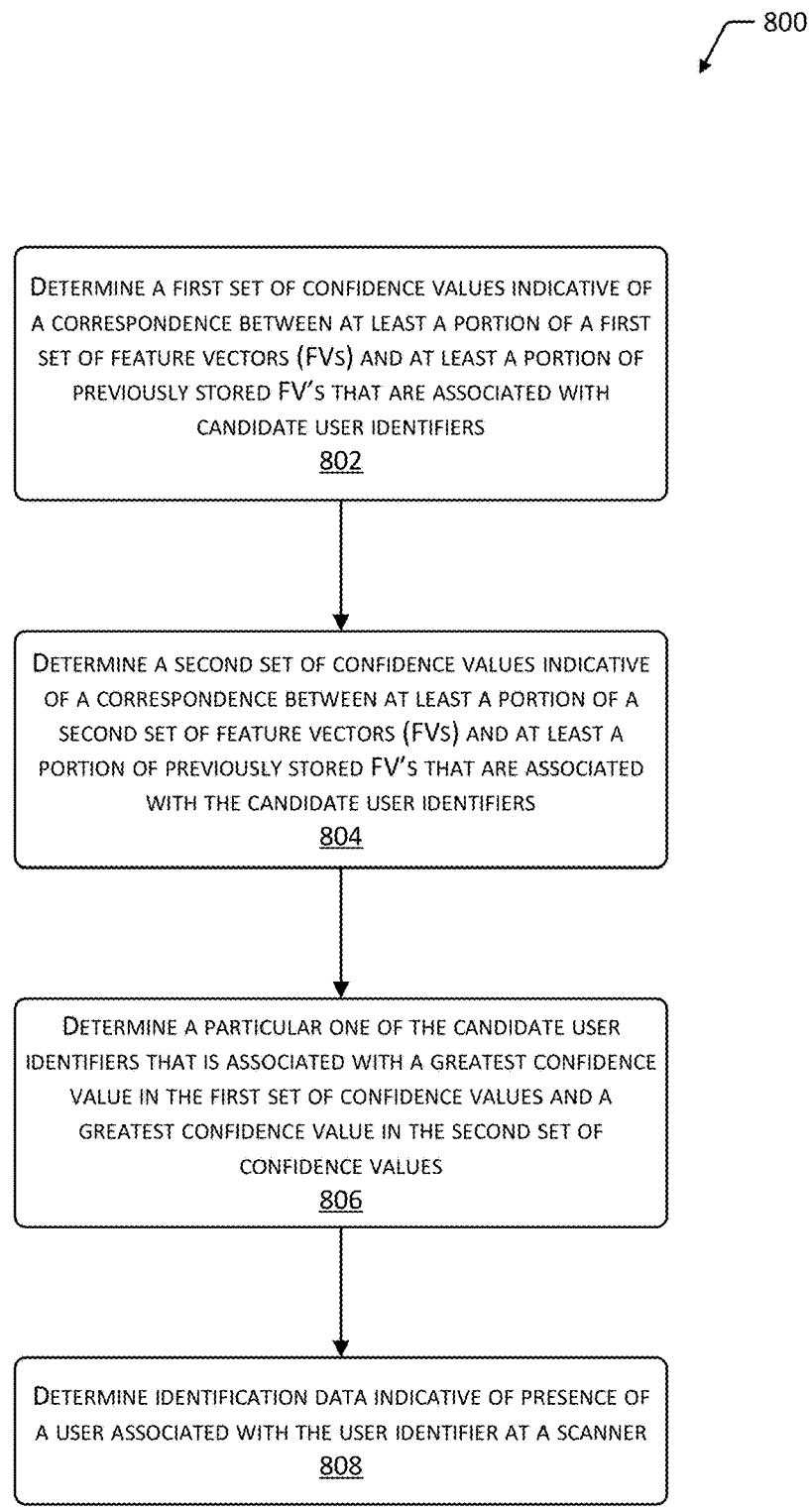
FIG. 8 illustrates a flow diagram of a process to rank and select a particular candidate user identifier based on rankings of sub-images, according to some implementations.

FIG. 8 illustrates a flow diagram 800 of a process to rank and select a particular candidate user identifier based on rankings of sub-images 310, according to some implementations. The process may be implemented at least in part by the identification system 120.

At 802, a first set of confidence values is determined that is indicative of a correspondence between at least a portion of a first set of feature vectors obtained from the processed image data 408 and at least a portion of previously stored feature vectors in the stored user feature data 130. For example, feature vectors associated with first modality images obtained by the scanner 106 are compared to previously stored first modality feature vectors in the stored user feature data 130. The previously stored feature vectors are associated with candidate user identifiers.

At 804, a second set of confidence values are determined indicative of a correspondence between at least a portion of a second set of feature vectors obtained from the processed image data 408 and at least a portion of previously stored feature vectors in the stored user feature data 130. For example, feature vectors associated with second modality images obtained by the scanner 106 are compared to previously stored second modality images in the stored user feature data 130. The previously stored feature vectors are associated with the candidate user identifiers.

At 806, the user identifier 432 of the user 102 is determined based on a particular one of the candidate user identifiers that is associated with a greatest confidence value in the first set of confidence values and a greatest confidence value in the second set of confidence values. In some implementations, a predetermined weight may be applied to one or more of the first set of confidence values or the second set of confidence values.

At 808, identification data 132 is determined that is indicative of a presence of the user 102 associated with the user identifier 432 at the scanner 106 at the time the raw image data 110 was acquired.

Figure 9:
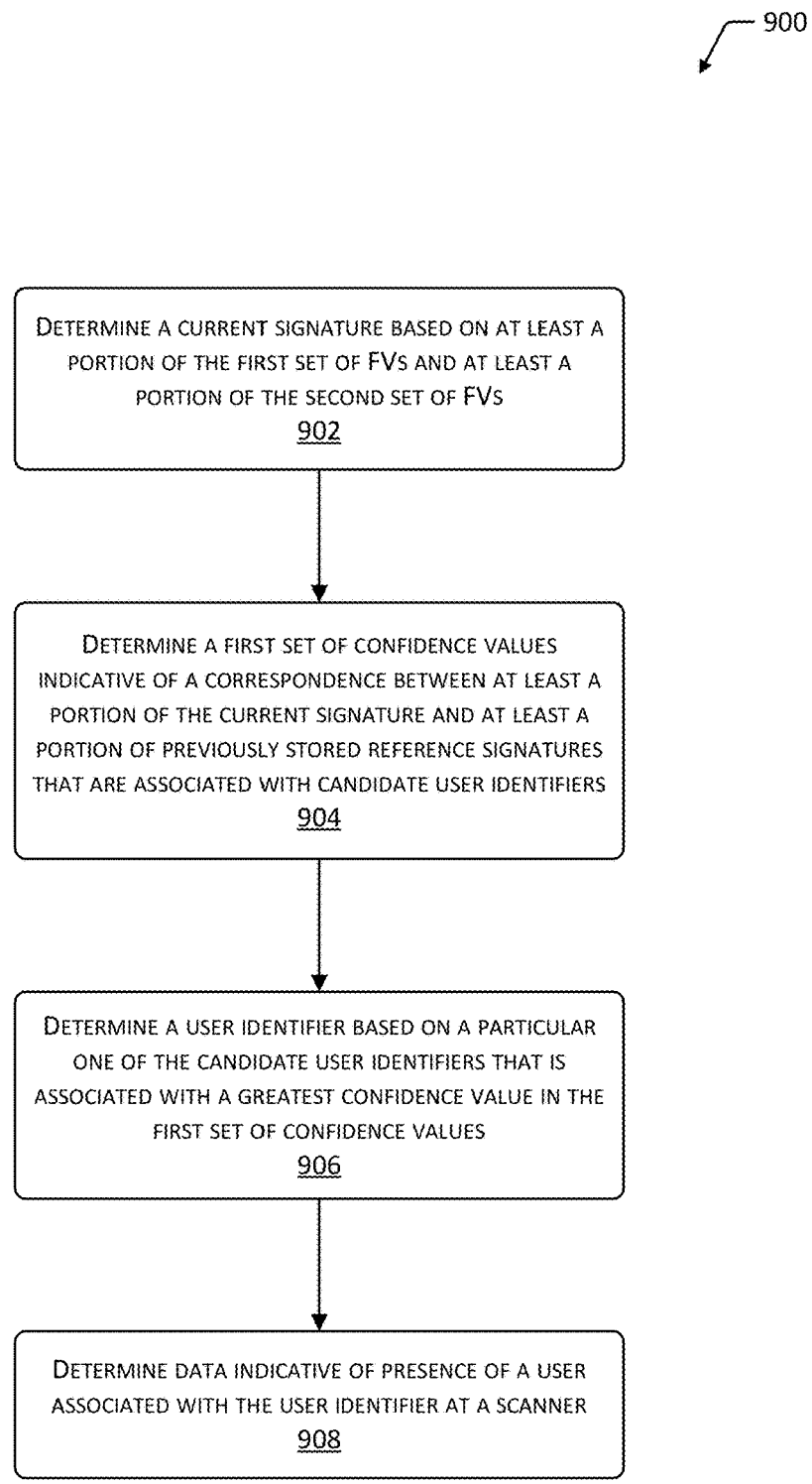
FIG. 9 illustrates a flow diagram of a process to rank and select a particular candidate user identifier by comparing a current signature with one or more reference signatures, according to some implementations.

FIG. 9 illustrates a flow diagram 900 of a process to rank and select a particular candidate user identifier using the current signature 428 and reference signatures 430, according to some implementations. The process may be implemented at least in part by the identification system 120.

At 902, a current signature 428 is determined based on one or more of at least a portion of the first set of feature vectors based on the processed image data 408 and at least a portion of the second set of feature vectors based on the processed image data 408. For example, the first set of feature vectors and the second set of feature vectors may be combined into a common vector space to produce the current signature 428.

In one implementation, the current signature 428 may be determined using a neural network. For example, the first set of feature vectors and the second set of feature vectors may be provided as input to a convolutional neural network that has been previously trained to generate a current signature 428 comprising a unified embedding vector representative of the palm. The resulting current signature 428 has a reduced overall dimensionality compared to the individual feature vectors. In some implementations the unified embedding vector may be subsequently compared to previously stored data such as reference signatures 430 as described below to determine a candidate user identifier.

At 904, a first set of confidence values is determined that is indicative of correspondence between the current signature 428 and at least a portion of previously stored reference signatures 430 in the stored user feature data 130. For example, the confidence values may be based on a Euclidean distance between the current signature 428 and a particular reference signature 430 in the common vector space. As described above, the previously stored reference signatures 430 are associated with candidate user identifiers.

At 906, the user identifier 432 is determined based on a particular one of the candidate user identifiers that is associated with a greatest confidence value in the first set of confidence values. In some implementations, additional determinations may be made. For example, if the difference between the confidence values of a top ranked candidate user identifier and a second ranked candidate user identifier is less than a threshold value, no identity may be determined. In another example, if the confidence value of the top ranked candidate user identifier is less than a threshold value, no identity may be determined. Likewise, the determination of the user identifier 432 may be based on the confidence values meeting one or both of the previous thresholds.

At 908 data indicative of a presence of the user 102 associated with the user identifier 432 at the scanner 106 is determined.

Figure 10:
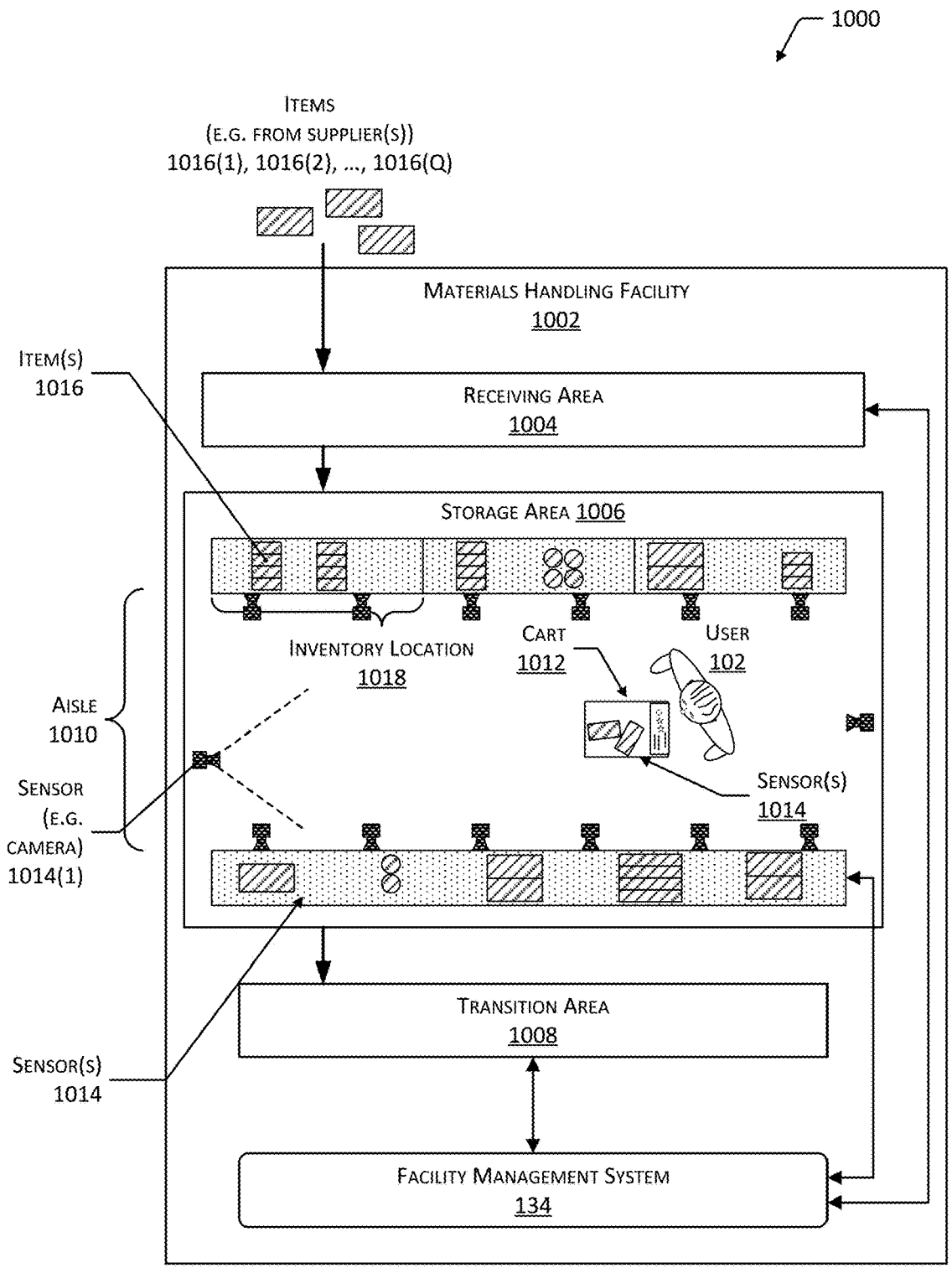
FIG. 10 is a block diagram illustrating a materials handling facility (facility) using the system, according to some implementations.

FIG. 10 is a block diagram 1000 illustrating a materials handling facility (facility) 1002 using the system 100, according to some implementations. A facility 1002 comprises one or more physical structures or areas within which one or more items 1016(1), 1016(2), . . . , 1016(Q) may be held. The items 1016 may comprise physical goods, such as books, pharmaceuticals, repair parts, electronic gear, and so forth.

The facility 1002 may include one or more areas designated for different functions with regard to inventory handling. In this illustration, the facility 1002 includes a receiving area 1004, a storage area 1006, and a transition area 1008.

The receiving area 1004 may be configured to accept items 1016, such as from suppliers, for intake into the facility 1002. For example, the receiving area 1004 may include a loading dock at which trucks or other freight conveyances unload the items 1016. In some implementations, the items 1016 may be processed, at the receiving area 1004, to generate at least a portion of the item data. For example, an item 1016 may be weighed, imaged or otherwise scanned to develop reference images or representations of the item 1016 at the receiving area 1004.

The storage area 1006 is configured to store the items 1016. The storage area 1006 may be arranged in various physical configurations. In one implementation, the storage area 1006 may include one or more aisles 1010. The aisle 1010 may be configured with, or defined by, inventory locations 1018 on one or both sides of the aisle 1010. The inventory locations 1018 may include one or more of a platform, a rack, a case, a cabinet, a bin, a floor location, or other suitable storage mechanisms for holding, supporting, or storing the items 1016. For example, the inventory locations 1018 may comprise shelves with areas such as lanes designated therein. The inventory locations 1018 may be affixed to the floor or another portion of the structure of the facility 1002. The inventory locations 1018 may also be movable such that the arrangements of aisles 1010 may be reconfigurable. In some implementations, the inventory locations 1018 may be configured to move independently of an outside operator. For example, the inventory locations 1018 may comprise a rack with a power source and a motor, operable by a computing device to allow the rack to move from one location within the facility 1002 to another.

One or more users 102(1), 102(2), . . . , 102(U) and carts 1012(1), 1012(2), . . . , 1012(T) or other material handling apparatus may move within the facility 1002. For example, the user 102 may move about within the facility 1002 to pick or place the items 1016 in various inventory locations 1018, placing them in the cart 1012 for ease of transport. The cart 1012 is configured to carry or otherwise transport one or more items 1016. For example, the cart 1012 may include a basket, cart, bag, bin, and so forth. In other implementations, other material handling apparatuses such as robots, forklifts, cranes, aerial drones, and so forth, may move about the facility 1002 picking, placing, or otherwise moving the items 1016. For example, a robot may pick an item 1016 from a first inventory location 1018(1) and move the item 1016 to a second inventory location 1018(2).

While the storage area 1006 is depicted as having one or more aisles 1010, inventory locations 1018 storing the items 1016, sensors 1014, and so forth, it is understood that the receiving area 1004, the transition area 1008, or other areas of the facility 1002 may be similarly equipped. Furthermore, the arrangement of the various areas within the facility 1002 is depicted functionally rather than schematically. For example, in some implementations, multiple different receiving areas 1004, storage areas 1006, and transition areas 1008 may be interspersed rather than segregated in the facility 1002.

The facility 1002 may include, or be coupled to, the facility management system 134 described above. The facility management system 134 is configured to interact with users 102 or devices such as sensors 1014, robots, material handling equipment, computing devices, and so forth, in one or more of the receiving area 1004, the storage area 1006, or the transition area 1008.

During operation of the facility 1002, the weight sensors 1014(16) and other sensors 1014 may be configured to provide sensor data, or information based on the sensor data, to the facility management system 134. In addition to data obtained from the weight sensors 1014(16), the sensor data may include image data, non-image data, and so forth. The sensors 1014 may include, but are not limited to, weight sensors 1014(16), cameras 1014(1), and so forth. The sensors 1014 may be stationary or mobile, relative to the facility 1002. For example, the facility 1002 may include cameras 1014(1) to obtain images of the user 102 or other objects in the facility 1002. In another example, the inventory locations 1018 may contain weight sensors 1014(16) to acquire weight sensor data of items 1016 stowed therein, cameras 1014(1) to acquire images of picking or placement of items 1016 on shelves, and so forth. The sensors 1014 are described in more detail below with regard to FIG. 11.

The facility management system 134 or other systems may use the sensor data to track the location of objects within the facility 1002, movement of the objects, or provide other functionality. Objects may include, but are not limited to, items 1016, users 102, carts 1012, and so forth. For example, a series of images acquired by the cameras 1014(1) may indicate removal by the user 102 of an item 1016 from a particular location at the inventory location 1018 and placement of the item 1016 on or at least partially within the cart 1012.

The facility 1002 may be configured to receive different kinds of items 1016 from various suppliers and to store them until a customer orders or retrieves one or more of the items 1016. A general flow of items 1016 through the facility 1002 is indicated by the arrows of FIG. 10. Specifically, as illustrated in this example, items 1016 may be received from one or more suppliers, such as manufacturers, distributors, wholesalers, and so forth, at the receiving area 1004. In various implementations, the items 1016 may include merchandise, commodities, perishables, or any suitable type of item 1016, depending on the nature of the enterprise that operates the facility 1002.

Upon being received from a supplier at the receiving area 1004, the items 1016 may be prepared for storage in the storage area 1006. For example, in some implementations, items 1016 may be unpacked or otherwise rearranged. The facility management system 134 may include one or more software applications executing on a computer system to provide inventory management functions. These inventory management functions may include maintaining information indicative of the type, quantity, condition, cost, location, weight, or any other suitable parameters with respect to the items 1016. The items 1016 may be stocked, managed, or dispensed in terms of countable units, individual units, or multiple units, such as packages, cartons, crates, pallets, or other suitable aggregations. Alternatively, some items 1016, such as bulk products, commodities, and so forth, may be stored in continuous or arbitrarily divisible amounts that may not be inherently organized into countable units. Such items 1016 may be managed in terms of a measurable quantity such as units of length, area, volume, weight, time, duration, or other dimensional properties characterized by units of measurement. Generally speaking, a quantity of an item 1016 may refer to either a countable number of individual or aggregate units of an item 1016 or a measurable amount of an item 1016, as appropriate.

After arriving through the receiving area 1004, items 1016 may be stored within the storage area 1006. In some implementations, like items 1016 may be stored or displayed together in the inventory locations 1018 such as in bins, on shelves, hanging from pegboards, and so forth. In this implementation, all items 1016 of a given kind are stored in one inventory location 1018. In other implementations, like items 1016 may be stored in different inventory locations 1018. For example, to optimize retrieval of certain items 1016 having frequent turnover within a large physical facility 1002, those items 1016 may be stored in several different inventory locations 1018 to reduce congestion that might occur at a single inventory location 1018.

When a customer order specifying one or more items 1016 is received, or as a user 102 progresses through the facility 1002, the corresponding items 1016 may be selected or "picked" from the inventory locations 1018 containing those items 1016. In various implementations, item picking may range from manual to completely automated picking. For example, in one implementation, a user 102 may have a list of items 1016 they desire and may progress through the facility 1002 picking items 1016 from inventory locations 1018 within the storage area 1006 and placing those items 1016 into a cart 1012. In other implementations, employees of the facility 1002 may pick items 1016 using written or electronic pick lists derived from customer orders. These picked items 1016 may be placed into the cart 1012 as the employee progresses through the facility 1002.

After items 1016 have been picked, the items 1016 may be processed at a transition area 1008. The transition area 1008 may be any designated area within the facility 1002 where items 1016 are transitioned from one location to another or from one entity to another. For example, the transition area 1008 may be a packing station within the facility 1002. When the item 1016 arrives at the transition area 1008, the item 1016 may be transitioned from the storage area 1006 to the packing station. Information about the transition may be maintained by the facility management system 134.

In another example, if the items 1016 are departing the facility 1002, a list of the items 1016 may be obtained and used by the facility management system 134 to transition responsibility for, or custody of, the items 1016 from the facility 1002 to another entity. For example, a carrier may accept the items 1016 for transport with that carrier accepting responsibility for the items 1016 indicated in the list. In another example, a user 102 may purchase or rent the items 1016 and remove the items 1016 from the facility 1002. During use of the facility 1002, the user 102 may move about the facility 1002 to perform various tasks, such as picking or placing the items 1016 in the inventory locations 1018.

To facilitate operation of the facility 1002, the facility management system 134 is configured to use the identification data 132, sensor data, and other information such as item data, physical layout data, and so forth, to generate interaction data.

The interaction data may provide information about an interaction, such as a pick of an item 1016 from the inventory location 1018, a place of an item 1016 to the inventory location 1018, a touch made to an item 1016 at the inventory location 1018, a gesture associated with an item 1016 at the inventory location 1018, and so forth. The interaction data may include one or more of the type of interaction, interaction location identifier indicative of where from the inventory location 1018 the interaction took place, item identifier, quantity change to the item 1016, user identifier 432, and so forth. The interaction data may then be used to further update the item data. For example, the quantity of items 1016 on hand at a particular lane on the platform may be changed based on an interaction that picks or places one or more items 1016.

As described above, the facility management system 134 may perform other operations, determining inventory to restock, determining user billing data, and so forth.

Figure 11:
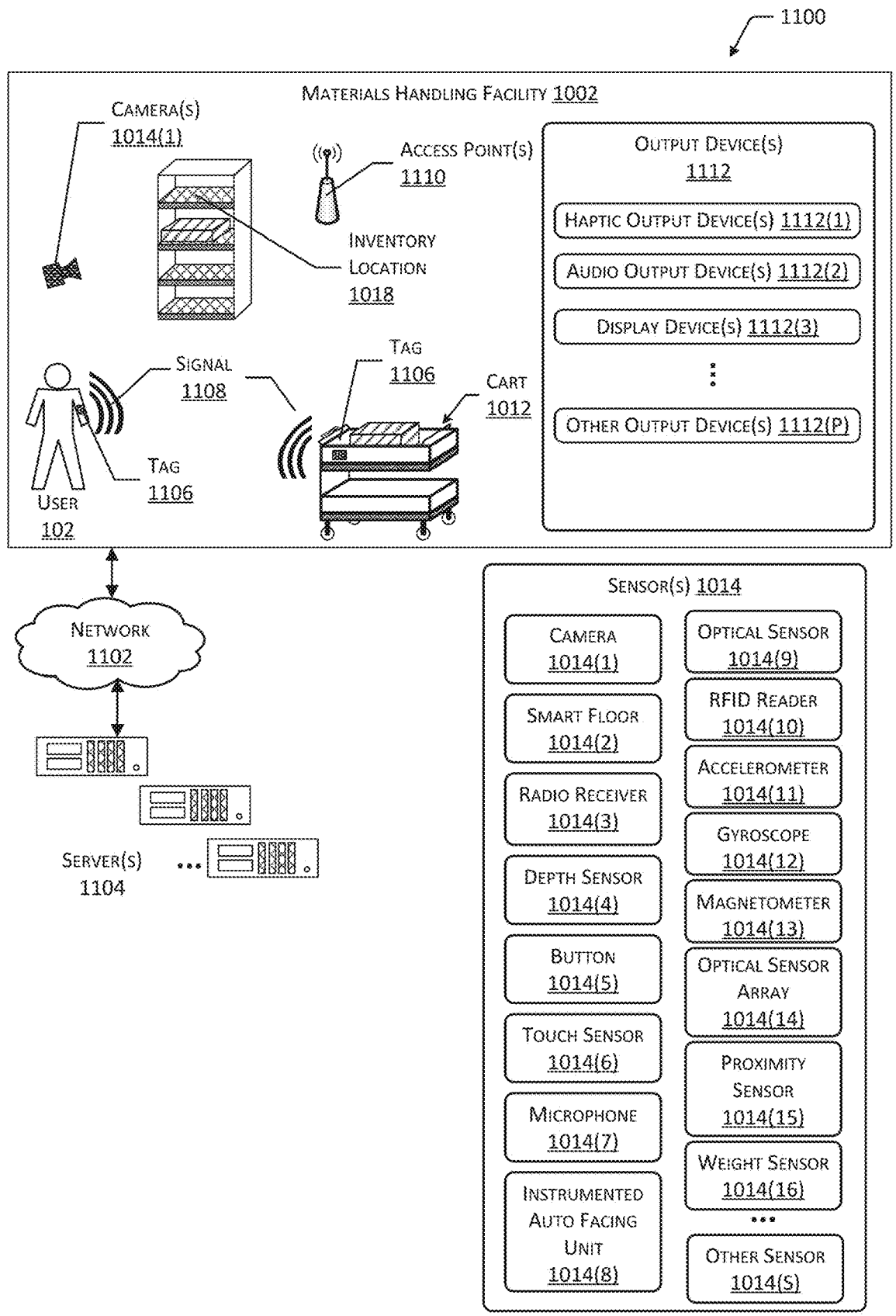
FIG. 11 is a block diagram illustrating additional details of the facility, according to some implementations.

FIG. 11 is a block diagram 1100 illustrating additional details of the facility 1002, according to some implementations. The facility 1002 may be connected to one or more networks 1102, which in turn connect to one or more computing devices, such as servers 1104. The network 1102 may include private networks such as an institutional or personal intranet, public networks such as the Internet, or a combination thereof. The network 1102 may utilize wired technologies (e.g., wires, fiber optic cables, and so forth), wireless technologies (e.g., radio frequency, infrared, acoustic, optical, and so forth), or other connection technologies. The network 1102 is representative of any type of communication network, including one or more of data networks or voice networks. The network 1102 may be implemented using wired infrastructure (e.g., copper cable, fiber optic cable, and so forth), a wireless infrastructure (e.g., cellular, microwave, satellite, and so forth), or other connection technologies.

The servers 1104 may be configured to execute one or more modules or software applications associated with the facility management system 134 or other systems. While the servers 1104 are illustrated as being in a location outside of the facility 1002, in other implementations, at least a portion of the servers 1104 may be located at the facility 1002. The servers 1104 are discussed in more detail below with regard to FIG. 12.

The user 102, the carts 1012, items 1016, or other objects in the facility 1002 may be equipped with one or more tags 1106. The tags 1106 may be configured to emit a signal 1108. In one implementation, the tag 1106 may be a radio frequency identification (RFID) tag 1106 configured to emit a RF signal 1108 upon activation by a first modality signal. For example, the first modality signal may comprise a radio frequency signal or a magnetic field configured to energize or activate the RFID tag 1106. In another implementation, the tag 1106 may comprise a transmitter and a power source configured to power the transmitter. For example, the tag 1106 may comprise a Bluetooth Low Energy (BLE) transmitter and battery. In other implementations, the tag 1106 may use other techniques to indicate presence of the tag 1106. For example, an acoustic tag 1106 may be configured to generate an ultrasonic signal 1108, which is detected by corresponding acoustic receivers. In yet another implementation, the tag 1106 may be configured to emit an optical signal 1108.

The facility management system 134 may be configured to use the tags 1106 for one or more of identification of the object, determining a location of the object, and so forth. For example, the user 102 may wear tags 1106, the carts 1012 may have tags 1106 affixed, items 1016 may have tags 1106 affixed to their packaging, and so forth, which may be read and, based at least in part on signal strength, used to determine one or more of identity or location.

Generally, the facility management system 134 or other systems associated with the facility 1002 may include any number and combination of input components, output components, and servers 1104.

The one or more sensors 1014 may be arranged at one or more locations within the facility 1002. For example, the sensors 1014 may be mounted on or within a floor, wall, at a ceiling, at an inventory location 1018, on a cart 1012, may be carried or worn by a user 102, and so forth.

The sensors 1014 may include one or more cameras 1014(1) or other imaging sensors. The one or more cameras 1014(1) may include imaging sensors configured to acquire images of a scene. The cameras 1014(1) are configured to detect light in one or more wavelengths including, but not limited to, terahertz, infrared, visible, ultraviolet, and so forth. The cameras 1014(1) may comprise charge coupled devices (CCD), complementary metal oxide semiconductor (CMOS) devices, microbolometers, and so forth. The facility management system 134 may use image data acquired by the cameras 1014(1) during operation of the facility 1002. For example, the facility management system 134 may identify items 1016, users 102, carts 1012, and so forth, based at least in part on their appearance within the image data acquired by the cameras 1014(1). The cameras 1014(1) may be mounted in various locations within the facility 1002. For example, cameras 1014(1) may be mounted overhead, on inventory locations 1018, may be worn or carried by a user 102, may be affixed to carts 1012, and so forth.

The sensors 1014 may include a smart floor 1014(2). The smart floor 1014(2) is able to provide information about the location of objects, such as users 102, carts 1012, and so forth. This information may include identifying the object, determining a location of the object, tracking the object, and so forth. The smart floor 1014(2) may utilize smart floor devices that comprise one or more of transmitters or receivers that radiate or receive electromagnetic signals 1108 from antennas located at or underneath the floor. Based on information about what antenna radiated a signal 1108 and what antenna acquired the signal 1108, information about an object on or above the floor may be determined. For example, the smart floor 1014(2) may comprise sensing elements, or segments. Each segment may include an antenna that is coupled to one or more of a transmitter or a receiver. During operation, the segment may transmit an electromagnetic signal 1108 that is radiated by the antenna, receive an electromagnetic signal 1108 that is acquired by the antenna, or both. In some implementations the smart floor 1014(2) may operate as a physically large touch sensor that is deployed at floor level. The electromagnetic signals 1108 provide information about the presence of an object thereon. For example, the segments may electromagnetically couple to objects that are close by, allowing for the detection of objects that are either in contact with the floor or above the floor. In some implementations, instead of or in addition to the visual tracking of the object, the smart floor 1014(2) may be used to provide object representation movement data. For example, the output from the segments obtained during a particular window of time may be processed in a fashion similar to the image data.

One or more radio receivers 1014(3) may also be included as sensors 1014. In some implementations, the radio receivers 1014(3) may be part of transceiver assemblies. The radio receivers 1014(3) may be configured to acquire RF signals 1108 associated with RFID, Wi-Fi, Bluetooth, ZigBee, 2G, 3G, 4G, LTE, or other wireless data transmission technologies. The radio receivers 1014(3) may provide information associated with data transmitted via radio frequencies, signal strength of RF signals 1108, and so forth. For example, information from the radio receivers 1014(3) may be used by the facility management system 134 to determine a location of an RF source, such as a transmitter carried by the user 102, a transmitter on the cart 1012, a tag 1106 on the item 1016, and so forth.

One or more depth sensors 1014(4) may also be included in the sensors 1014. The depth sensors 1014(4) are configured to acquire spatial or three-dimensional (3D) data, such as depth information, about objects within a field-of-view (FOV). The depth sensors 1014(4) may include range cameras, lidar systems, sonar systems, radar systems, structured light systems, stereo vision systems, optical interferometry systems, and so forth. The facility management system 134 may use the 3D data acquired by the depth sensors 1014(4) to identify objects, determine a location of an object in 3D real space, identify a user 102, and so forth.

One or more buttons 1014(5) may be configured to accept input from the user 102. The buttons 1014(5) may comprise mechanical, capacitive, optical, or other mechanisms. For example, the buttons 1014(5) may comprise mechanical switches configured to accept an applied force from a touch of the user 102 to generate an input signal. The facility management system 134 may use data from the buttons 1014(5) to receive information from the user 102. For example, the cart 1012 may be configured with a button 1014(5) to accept input from the user 102 and send information indicative of the input to the facility management system 134.

The sensors 1014 may include one or more touch sensors 1014(6). The touch sensors 1014(6) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The facility management system 134 may use data from the touch sensors 1014(6) to receive information from the user 102. For example, the touch sensor 1014(6) may be integrated with the cart 1012 to provide a touchscreen with which the user 102 may select from a menu one or more particular items 1016 for picking, enter a manual count of items 1016 at an inventory location 1018, and so forth.

One or more microphones 1014(7) may be configured to acquire information indicative of sound present in the environment. In some implementations, arrays of microphones 1014(7) may be used. These arrays may implement beamforming techniques to provide for directionality of gain. The facility management system 134 may use the one or more microphones 1014(7) to acquire information from acoustic tags 1106, accept voice input from an employee, and so forth. For example, audible instructions may be presented by one or more speakers to an employee, who may then verbally respond. Audio obtained from the microphones 1014(7) may be processed to determine the response of the employee.

The sensors 1014 may include instrumented auto facing units (IAFUs) 1014(8). The IAFU 1014(8) may comprise a position sensor configured to provide data indicative of displacement of a pusher. As an item 1016 is removed from the IAFU 1014(8), the pusher moves, such as under the influence of a spring, and pushes the remaining items 1016 in the IAFU 1014(8) to the front of the inventory location 1018. By using data from the position sensor, and given item data such as a depth of an individual item 1016, a count may be determined, based on a change in position data. For example, if each item 1016 is 1 inch deep, and the position data indicates a change of 11 inches, the quantity held by the IAFU 1014(8) may have changed by 11 items 1016. This count information may be used to confirm or provide a cross check for a count obtained by other means, such as analysis of the sensor data from the weight sensors 1014(16).

The sensors 1014 may include one or more optical sensors 1014(9). The optical sensors 1014(9) may be configured to provide data indicative of one or more of color or intensity of light impinging thereupon. For example, the optical sensor 1014(9) may comprise a photodiode and associated circuitry configured to generate a signal 1108 or data indicative of an incident flux of photons. As described below, the optical sensor array 1014(14) may comprise a plurality of the optical sensors 1014(9). The optical sensors 1014(9) may include photodiodes, photoresistors, photovoltaic cells, quantum dot photoconductors, bolometers, pyroelectric infrared detectors, and so forth. For example, the optical sensor 1014(9) may use germanium photodiodes to detect infrared light.

One or more radio frequency identification (RFID) readers 1014(10), near field communication (NFC) systems, and so forth, may be included as sensors 1014. For example, the RFID readers 1014(10) may be configured to read the RF tags 1106. Information acquired by the RFID reader 1014(10) may be used by the facility management system 134 to identify an object associated with the RF tag 1106 such as the item 1016, the user 102, the cart 1012, and so forth. For example, based on information from the RFID readers 1014(10) detecting the RF tag 1106 at a particular inventory location, an item 1016 being placed or picked may be determined.

The sensors 1014 may include one or more accelerometers 1014(11), which may be worn or carried by the user 102, mounted to the cart 1012, and so forth. The accelerometers 1014(11) may provide information such as the direction and magnitude of an imposed acceleration. Data such as rate of acceleration, determination of changes in direction, speed, and so forth, may be determined using the accelerometers 1014(11).

A gyroscope 1014(12) may provide information indicative of rotation of an object affixed thereto. For example, the cart 1012 or other objects may be equipped with a gyroscope 1014(12) to provide data indicative of a change in orientation of the object.

A magnetometer 1014(13) may be used to determine an orientation by measuring ambient magnetic fields, such as the terrestrial magnetic field. The magnetometer 1014(13) may be worn or carried by the user 102, mounted to the cart 1012, and so forth. For example, the magnetometer 1014(13) mounted to the cart 1012 may act as a compass and provide information indicative of which direction the cart 1012 is oriented.

An optical sensor array 1014(14) may comprise one or optical sensors 1014(9). The optical sensors 1014(9) may be arranged in a regular, repeating, or periodic two-dimensional arrangement such as a grid. The optical sensor array 1014 (14) may generate image data. For example, the optical sensor array 1014(14) may be arranged within or below an inventory location 1018 and obtain information about shadows of items 1016, hand 108 of the user 102, and so forth.

The sensors 1014 may include proximity sensors 1014 (15) used to determine presence of an object, such as the user 102, the cart 1012, and so forth. The proximity sensors 1014(15) may use optical, electrical, ultrasonic, electromagnetic, or other techniques to determine a presence of an object. In some implementations, the proximity sensors 1014(15) may use an optical emitter and an optical detector to determine proximity. For example, an optical emitter may emit light, a portion of which may then be reflected by the object back to the optical detector to provide an indication that the object is proximate to the proximity sensor 1014 (15). In other implementations, the proximity sensors 1014 (15) may comprise a capacitive proximity sensor 1014(15) configured to provide an electrical field and determine a change in electrical capacitance due to presence or absence of an object within the electrical field.

The proximity sensors 1014(15) may be configured to provide sensor data indicative of one or more of a presence or absence of an object, a distance to the object, or characteristics of the object. An optical proximity sensor 1014(15) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 1014 such as a camera 1014(1). Based on an apparent distance between the features of the structured light pattern, the distance to the object may be calculated. Other techniques may also be used to determine distance to the object. In another example, the color of the reflected light may be used to characterize the object, such as skin, clothing, cart 1012, and so forth.

The one or more weight sensors 1014(16) are configured to measure the weight of a load, such as the item 1016, the cart 1012, or other objects. The weight sensors 1014(16) may be configured to measure the weight of the load at one or more of the inventory locations 1018, the cart 1012, on the floor of the facility 1002, and so forth. For example, a platform of the inventory location 1018 may include a plurality of weight sensors 1014(16). The weight sensors 1014(16) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 1014(16) may operate as transducers that generate one or more signals based on an applied force, such as that of the load due to gravity. For example, the weight sensor 1014(16) may comprise a load cell having a strain gauge and a structural member that deforms slightly when weight is applied. By measuring a change in the electrical characteristic of the strain gauge, such as capacitance or resistance, the weight may be determined. In another example, the weight sensor 1014(16) may comprise a force sensing resistor (FSR). The FSR may comprise a resilient material that changes one or more electrical characteristics when compressed. For example, the electrical resistance of a particular portion of the FSR may decrease as the particular portion is compressed. The facility management system 134 may use the data acquired by the weight sensors 1014(16) to identify an object, determine a change in the quantity of objects, determine a location of an object, maintain shipping records, and so forth.

The sensors 1014 may include other sensors 1014(5) as well. For example, the other sensors 1014(5) may include light curtains, ultrasonic rangefinders, thermometers, barometric sensors, hygrometers, and so forth.

In some implementations, the sensors 1014 may include hardware processors, memory, and other elements configured to perform various functions. For example, the cameras 1014(1) may be configured to generate image data, send the image data to another device such as the server 1104, and so forth.

The facility 1002 may include one or more access points 1110 configured to establish one or more wireless networks. The access points 1110 may use Wi-Fi, NFC, Bluetooth, or other technologies to establish wireless communications between a device and the network 1102. The wireless networks allow the devices to communicate with one or more of the sensors 1014, the facility management system 134, the tag 1106, a communication device of the cart 1012, or other devices.

Output devices 1112 may also be provided in the facility 1002. The output devices 1112 are configured to generate signals 1108, which may be perceived by the user 102 or detected by the sensors 1014. In some implementations, the output devices 1112 may be used to provide illumination of the optical sensor array 1014(14).

Haptic output devices 1112(1) are configured to provide a signal 1108 that results in a tactile sensation to the user 102. The haptic output devices 1112(1) may use one or more mechanisms such as electrical stimulation or mechanical displacement to provide the signal 1108. For example, the haptic output devices 1112(1) may be configured to generate a modulated electrical signal 1108, which produces an apparent tactile sensation in one or more fingers of the user 102. In another example, the haptic output devices 1112(1) may comprise piezoelectric or rotary motor devices configured to provide a vibration, which may be felt by the user 102.

One or more audio output devices 1112(2) may be configured to provide acoustic output. The acoustic output includes one or more of infrasonic sound, audible sound, or ultrasonic sound. The audio output devices 1112(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 1112(3) may be configured to provide output, which may be seen by the user 102 or detected by a light-sensitive sensor such as a camera 1014(1) or an optical sensor 1014(9). In some implementations, the display devices 1112(3) may be configured to produce output in one or more of infrared, visible, or ultraviolet light. The output may be monochrome or in color. The display devices 1112(3) may be one or more of emissive, reflective, microelectromechanical, and so forth. An emissive display device 1112(3), such as using LEDs, is configured to emit light during operation. In comparison, a reflective display device 1112(3), such as using an electrophoretic element, relies on ambient light to present an image. Backlights or front lights may be used to illuminate non-emissive display devices 1112(3) to provide visibility of the output in conditions where the ambient light levels are low.

The display devices 1112(3) may be located at various points within the facility 1002. For example, the addressable displays may be located on inventory locations 1018, carts 1012, on the floor of the facility 1002, and so forth.

Other output devices 1112(P) may also be present. For example, the other output devices 1112(P) may include scent/odor dispensers, document printers, 3D printers or fabrication equipment, and so forth.

Figure 12:
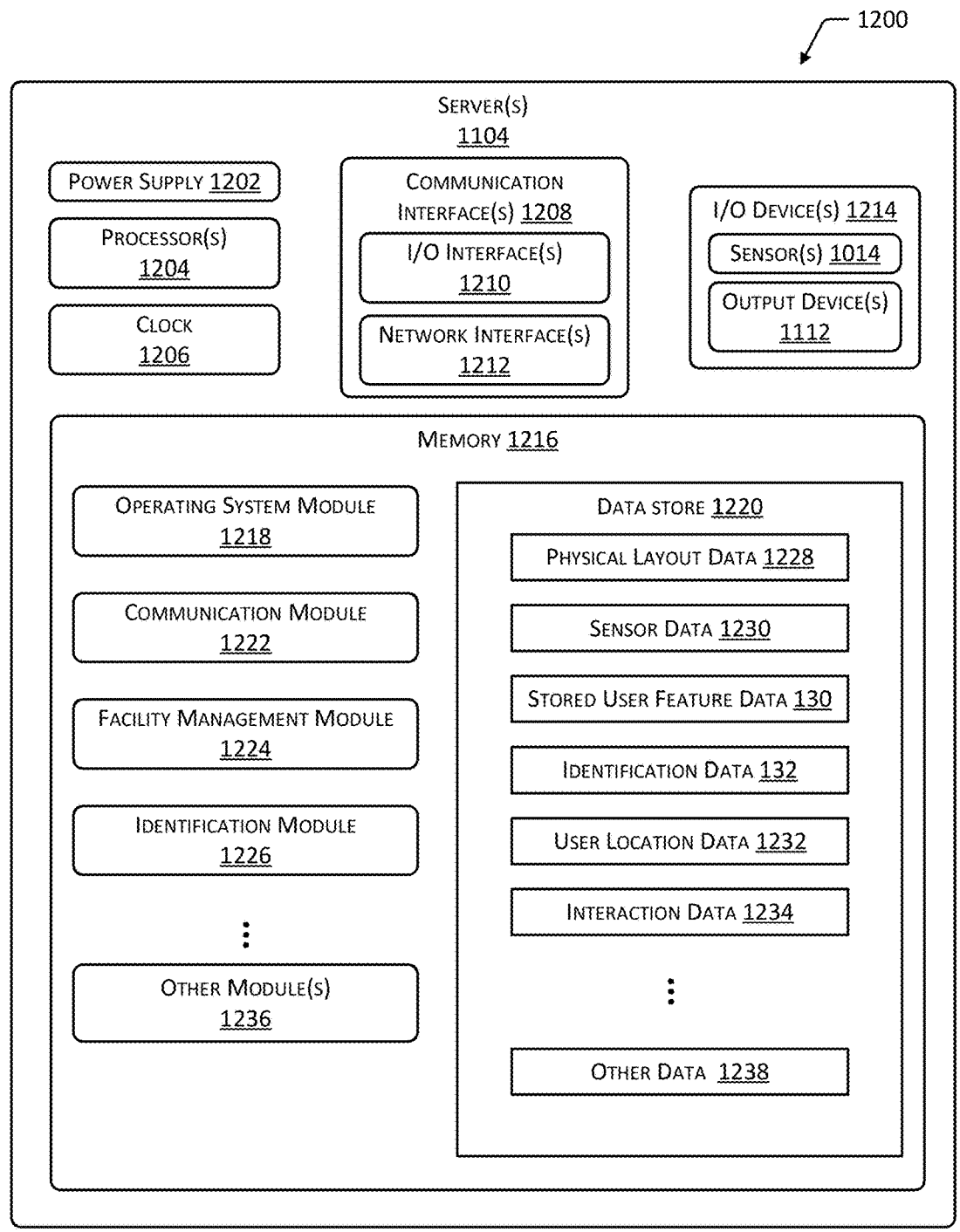
FIG. 12 is a block diagram of a server to support operation of the facility, according to some implementations.

FIG. 12 illustrates a block diagram 1200 of a server 1104 configured to support operation of the facility 1002, according to some implementations. The server 1104 may be physically present at the facility 1002, may be accessible by the network 1102, or a combination of both. The server 1104 does not require end-user knowledge of the physical location and configuration of the system that delivers the services. Common expressions associated with the server 1104 may include "on-demand computing", "software as a service (SaaS)", "platform computing", "network-accessible platform", "cloud services", "data centers", and so forth. Services provided by the server 1104 may be distributed across one or more physical or virtual devices.

One or more power supplies 1202 may be configured to provide electrical power suitable for operating the components in the server 1104. The one or more power supplies 1202 may comprise batteries, capacitors, fuel cells, photovoltaic cells, wireless power receivers, conductive couplings suitable for attachment to a first modality power source such as provided by an electric utility, and so forth. The server 1104 may include one or more hardware processors 1204 (processors) configured to execute one or more stored instructions. The processors 1204 may comprise one or more cores. One or more clocks 1206 may provide information indicative of date, time, ticks, and so forth. For example, the processor 1204 may use data from the clock 1206 to associate a particular interaction with a particular point in time.

The server 1104 may include one or more communication interfaces 1208 such as input/output (I/O) interfaces 1210, network interfaces 1212, and so forth. The communication interfaces 1208 enable the server 1104, or components thereof, to communicate with other devices or components. The communication interfaces 1208 may include one or more I/O interfaces 1210. The I/O interfaces 1210 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 1210 may couple to one or more I/O devices 1214. The I/O devices 1214 may include input devices such as one or more of a sensor 1014, keyboard, mouse, scanner, and so forth. The I/O devices 1214 may also include output devices 1112 such as one or more of a display device 1112(3), printer, audio speakers, and so forth. In some embodiments, the I/O devices 1214 may be physically incorporated with the server 1104 or may be externally placed.

The network interfaces 1212 may be configured to provide communications between the server 1104 and other devices, such as the carts 1012, routers, access points 1110, and so forth. The network interfaces 1212 may include devices configured to couple to personal area networks (PANs), local area networks (LANs), wireless local area networks (WLANS), wide area networks (WANs), and so forth. For example, the network interfaces 1212 may include devices compatible with Ethernet, Wi-Fi, Bluetooth, ZigBee, and so forth.

The server 1104 may also include one or more busses or other internal communications hardware or software that allow for the transfer of data between the various modules and components of the server 1104.

As shown in FIG. 12, the server 1104 includes one or more memories 1216. The memory 1216 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 1216 provides storage of computer-readable instructions, data structures, program modules, and other data for the operation of the server 1104. A few example functional modules are shown stored in the memory 1216, although the same functionality may alternatively be implemented in hardware, firmware, or as a system on a chip (SoC).

The memory 1216 may include at least one operating system (OS) module 1218. The OS module 1218 is configured to manage hardware resource devices such as the I/O interfaces 1210, the I/O devices 1214, the communication interfaces 1208, and provide various services to applications or modules executing on the processors 1204. The OS module 1218 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 1216 may be a data store 1220 and one or more of the following modules. These modules may be executed as foreground applications, background tasks, daemons, and so forth. The data store 1220 may use a flat file, database, linked list, tree, executable code, script, or other data structure to store information. In some implementations, the data store 1220 or a portion of the data store 1220 may be distributed across one or more other devices including the servers 1104, network attached storage devices, and so forth.

A communication module 1222 may be configured to establish communications with one or more of the carts 1012, sensors 1014, display devices 1112(3), other servers 1104, or other devices. The communications may be authenticated, encrypted, and so forth.

The memory 1216 may store a facility management module 1224. The facility management module 1224 is configured to provide the inventory functions as described herein with regard to the facility management system 134. For example, the facility management module 1224 may track items 1016 between different inventory locations 1018, to and from the carts 1012, generate restocking orders, direct operation of robots within the facility, use the identification data 132 to associate a particular user identity with a user 102 in the facility 1002, and so forth. During operation, the facility management module 1224 may access sensor data 1230 such as one or more of image data from the cameras 1014(1), weight data from the weight sensors 1014(16), and so forth.

Information used by the facility management module 1224 may be stored in the data store 1220. For example, the data store 1220 may be used to store physical layout data 1228, sensor data 1230, the stored user feature data 130, identification data 132, user location data 1232, interaction data 1234, and so forth. The sensor data 1230 may comprise information obtained from one or more of the sensors 1014 in or associated with the facility 1002.

The physical layout data 1228 may provide information indicative of where scanners 106, cameras 1314(1), weight sensors 1014(16), antennas for the radio receivers 1014(3), inventory locations 1018, and so forth are in the facility 1002 with respect to one another. For example, the physical layout data 1228 may comprise information representative of a map or floor plan of the facility 1002 with relative positions of gates 104 with scanners 106 and inventory locations 1018.

The facility management module 1224 may generate the user location data 1232 that is indicative of the location of the user 102 within the facility 1002. For example, the facility management module 1224 may use image data obtained by the cameras 1014(1) to determine a location of the user 102. In other implementations, other techniques may be used for determining the user location data 1232. For example, data from the smart floor 1012(2) may be used to determine the location of the user 102.

A user identity may be associated with tracking data based on the identification data 132. For example, the user 102 enters the facility 1002 and has their palm scanned, producing identification data 132 that is indicative of their time of entry, the gate 104 through which they entered, and their user identifier 432. The tracking data indicative of a track of a user 102 that begins at a gate 104 at the time of entry may be associated with the user identifier 432 in the identification data 132.

Based on the user location data 1232 and the interaction data 1234, a particular interaction may be associated with an account of a particular user 102. For example, if the user location data 1232 indicates that the user 102 is present in front of inventory location 1018(492) at time 17:47:20 and the interaction data 1234 indicates a pick of a quantity of one item 1016(D) from an area on inventory location 1018(492) at 17:47:27, the user 102 may be billed for that pick.

The facility management module 1224 may use the sensor data 1230 to generate the interaction data 1234. The interaction data 1234 may include information about the type of item involved, quantity involved, whether the interaction was a pick or place, and so forth. Interactions may include the user 102 picking an item 1016 from an inventory location 1018, placing an item 1016 at the inventory location 1018, touching an item 1016 at the inventory location 1018, rummaging through items 1016 at the inventory location 1018, and so forth. For example, the facility management module 1224 may generate interaction data 1234 that indicates what item 1016 the user 102 picked from a particular lane on a shelf, and then use this interaction data 1234 to adjust the count of inventory stowed at that lane. The interaction data 1234 may then be used to bill an account associated with the user identifier 432 that is associated with the user 102 who picked the item 1016.

The facility management module 1224 may process the sensor data 1230 and generate output data. For example, based on the interaction data 1234, a quantity of a type of item 1016 at a particular inventory location 1018 may drop below a threshold restocking level. The system may generate output data comprising a restocking order indicative of the inventory location 1018, the area, and a quantity needed to replenish stock to a predetermined level. The restocking order may then be used to direct a robot to restock that inventory location 1018.

The memory 1216 may also store an identification module 1226. The identification module 1226 may perform one or more of the functions described above with respect to the identification system 120.

Other modules 1236 may also be present in the memory 1216 as well as other data 1238 in the data store 1220. For example, a billing module may use the interaction data 1234 and the identification data 132 to bill an account associated with a particular user 102.

The devices and techniques described in this disclosure may be used in a variety of other settings. For example, the system may be used in conjunction with a point-of-sale (POS) device. The user 102 may present their hand 108 to a scanner 106 to provide an indication of intent and authorization to pay with an account associated with the identification data 132. In another example, a robot may incorporate a scanner 106. The robot may use the identification data 132 to determine whether to deliver a parcel to the user 102, and based on the identification data 132, which parcel to deliver.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   a scanner comprising:
      a first infrared light source having a polarizer with a first polarization, wherein the first infrared light source produces light with the first polarization at a first time;
      a second infrared light source having a polarizer with a second polarization, wherein the second infrared light source produces light with the second polarization at a second time; and
      a first camera having a polarizer with the first polarization, wherein the first camera:
         acquires a first raw image at the first time, and
         acquires a second raw image at the second time; and
   a computing device comprising:
      a memory, storing first computer-executable instructions; and
      a hardware processor to execute the first computer-executable instructions to:
         generate a first processed image from the first raw image, wherein the first processed image depicts a human palm in a canonical orientation and a canonical pose and the first processed image showing a surface of the human palm;
         generate a second processed image from the second raw image, wherein the second processed image depicts the human palm in the canonical orientation and the canonical pose and the second processed image showing a vein pattern of the human palm;
         determine a first set of sub-images wherein the sub-images in the first set of sub-images correspond to particular areas within the first processed image;
         determine, using a first neural network, a first set of feature vectors for one or more of the sub-images in the first set of sub-images;
         determine a second set of sub-images wherein the sub-images in the second set of sub-images correspond to particular areas within the second processed image;
         determine, using a second neural network, a second set of feature vectors for one or more of the sub-images in the second set of sub-images;
         determine, using the first set of feature vectors and the second set of feature vectors as inputs to a third neural network, a current signature;
         compare the current signature with a reference signature; and
         determine a user identifier based on the comparison of the current signature and the reference signature.

2. The system of claim 1, wherein the first computer-executable instructions to generate the second processed image from the second raw image further comprise instructions to downsample the second raw image; and
   the first set of feature vectors are expressed within a k dimensional space and the second set of feature vectors are expressed within a p dimensional space, wherein k is greater than p.

3. A system comprising:
   an infrared light source;
   a camera;
   a controller to:
      at a first time, illuminate a scene with first infrared light that exhibits a first polarization;
      operate the camera to acquire, using incoming light that exhibits the first polarization, first image data at the first time;
      at a second time, illuminate the scene with second infrared light that exhibits a second polarization; and
      operate the camera to acquire, using incoming light that exhibits the first polarization, second image data at the second time; and
   a computing device comprising:
      a memory, storing first computer-executable instructions; and
      a hardware processor to execute the first computer-executable instructions to:
         determine a first set of sub-images wherein each sub-image in the first set of sub-images corresponds to a particular area within the first image data;
         determine a first set of feature vectors for one or more of the sub-images in the first set of sub-images;
         determine a second set of sub-images wherein each sub-image in the second set of sub-images corresponds to a particular area within the second image data;
         determine a second set of feature vectors for one or more of the sub-images in the second set of sub-images;
         determine, based on the first set of feature vectors and the second set of feature vectors, one or more current signatures; and
         determine a user identifier based on comparison of at least a portion of the one or more current signatures with one or more reference signatures.

4. The system of claim 3, further comprising:
   the infrared light source comprising:
      a first infrared light source with light output passing through a first polarizer with the first polarization, and
      a second infrared light source with light output passing through a second polarizer with the second polarization; and
   the camera comprising a third polarizer with the first polarization.

5. The system of claim 3, further comprising:
   a polarizer that is responsive to an input from the controller to selectively filter light, the polarizer comprising one or more of:
   a wheel driven by an electric motor, the wheel comprising:
      a first segment having a first polarizing window that passes light with the first polarization, and
      a second segment having a second polarizing window that passes light with the second polarization;

a liquid crystal; or a photoelastic modulator.

6. The system of claim 3, the hardware processor to further execute the first computer-executable instructions to:

prior to the first computer-executable instructions to determine the first set of sub-images, process the first image data with instructions to:

determine a third set of images from the first image data that are representative of a human palm, determine, from the third set of images, a fourth set of images that are representative of a specific orientation of the human palm, and determine, from the fourth set of images, a fifth set of images that are representative of a specific pose of the human palm, wherein the first image data comprises at least a portion of the fifth set of images; and prior to the first computer-executable instructions to determine the second set of sub-images, process the second image data with instructions to:

determine a sixth set of images from the second image data that are representative of the human palm, determine, from the sixth set of images, a seventh set of images that are representative of the specific orientation of the human palm, and determine, from the seventh set of images, an eighth set of images that are representative of the specific pose of the human palm, wherein the second image data comprises at least a portion of the eighth set of images.

7. The system of claim 3, wherein the first computer-executable instructions to determine the one or more current signatures further comprise instructions to:

process at least a portion of the first set of feature vectors and the second set of feature vectors with a neural network to generate the one or more current signatures.

8. The system of claim 3, wherein the first computer-executable instructions to determine the one or more current signatures further comprise instructions to:

concatenate at least a portion of the first set of feature vectors and the second set of feature vectors to generate the one or more current signatures.

9. The system of claim 3, wherein the first computer-executable instructions to determine the first set of feature vectors further comprise instructions to:

process the one or more of the sub-images in the first set of sub-images with a first neural network trained to characterize images of a surface of a human palm, wherein output from the first neural network is a first feature vector expressed in an n dimensional space; and the first computer-executable instructions to determine the second set of feature vectors further comprise instructions to:

process the one or more of the sub-images in the second set of sub-images with a second neural network trained to characterize images of internal anatomical structures of the human palm, wherein the output from the second neural network is a second feature vector expressed in a p dimensional space, wherein p is less than n.

10. The system of claim 3, wherein the first computer-executable instructions to determine the user identifier further comprise instructions to:

determine a first set of confidence values indicative of correspondence between at least a portion of the one or more current signatures and at least a portion of the one or more reference signatures, wherein the one or more reference signatures are associated with candidate user identifiers; and determine the user identifier based on a particular one of the candidate user identifiers that is associated with a greatest confidence value in the first set of confidence values.

11. The system of claim 3, wherein the first set of sub-images have a first resolution and the hardware processor to further execute the first computer-executable instructions to:

downsample the second image data such that the second set of sub-images have a second resolution that is less than the first resolution.

12. A method comprising:

accessing first image data obtained by a camera using infrared light with a first polarization;

accessing second image data obtained by the camera with a polarizer having the first polarization and illumination using infrared light with a second polarization;

determining a first set of sub-images wherein the sub-images in the first set of sub-images correspond to particular areas within the first image data;

determining a first set of feature vectors for one or more of the sub-images in the first set of sub-images;

determining a second set of sub-images wherein the sub-images in the second set of sub-images correspond to particular areas within the second image data;

determining a second set of feature vectors for one or more of the sub-images in the second set of sub-images;

determining one or more current signatures based on one or more of the first set of feature vectors or the second set of feature vectors; and determining a user identifier based on the one or more current signatures and one or more previously stored reference signatures.

13. The method of claim 12, wherein the first image data depicts at least a portion of a surface of a human palm and the second image data depicts at least a portion of internal anatomical structures of the human palm.

14. The method of claim 12, the determining the one or more current signatures comprising:

concatenating at least a portion of the first set of feature vectors and the second set of feature vectors to generate the one or more current signatures.

15. The method of claim 12, the determining the first set of feature vectors comprising:

processing the one or more of the sub-images in the first set of sub-images with a first neural network trained to characterize images of a surface of a human palm, wherein output from the first neural network is a first feature vector expressed in an n dimensional space; and the determining the second set of feature vectors comprising:

processing the one or more of the sub-images in the second set of sub-images with a second neural network trained to characterize images of internal anatomical structures of the human palm, wherein the output from the second neural network is a second feature vector expressed in a p dimensional space, wherein p is less than n.

16. The method of claim 12, the determining the user identifier comprising:

determining a first set of distances in a vector space between the one or more current signatures and the one or more previously stored reference signatures, wherein the one or more previously stored reference signatures are associated with candidate user identifiers;

determining, based on the first set of distances in the vector space, one of the one or more previously stored reference signatures that is closest to the one or more current signatures in the vector space; and determining the user identifier based on a particular one of the candidate user identifiers that is associated with the one of the one or more previously stored reference signatures that is closest to the one or more current signatures in the vector space.

17. The method of claim 12, further comprising:

prior to the determining the first set of sub-images:
- accessing first raw image data obtained by the camera using the infrared light with the first polarization;
- generating the first image data from the first raw image data, wherein the first image data comprises one or more images that:
  - are representative of a human palm,
  - exhibit a specific orientation of the human palm,
  - exhibit a specific pose of the human palm,
  - exhibit overall brightness above a first threshold,
  - exhibit overall blur that is below a second threshold, and
  - are rectified; and prior to the determining the second set of sub-images:
- accessing second raw image data obtained by the camera using the infrared light with the second polarization; and
- generating the second image data from the second raw image data, wherein the second image data comprises one or more images that:
  - are representative of the human palm,
  - exhibit the specific orientation of the human palm,
  - exhibit the specific pose of the human palm,
  - exhibit overall brightness above a third threshold,
  - exhibit overall blur that is below a fourth threshold, and
  - are rectified.

18. The method of claim 12, wherein the first set of sub-images have a first resolution; and the method further comprising:

generating the second set of sub-images by downsampling the second image data such that the second set of sub-images have a second resolution that is less than the first resolution.

19. The method of claim 12, wherein the sub images in the first set of sub-images are representative of a first area in a field-of-view of the camera and the sub images in the second set of sub-images are representative of a second area in the field-of-view of the camera, further wherein the second area in the field-of-view is greater than the first area in the field-of-view.

20. The method of claim 12, the determining the first set of sub-images further comprising:
- applying an image transform to the one or more of the sub-images in the first set of sub-images; and the determining the second set of sub-images further comprising:
- applying an image transform to the one or more of the sub-images in the second set of sub-images.

* * * * *